US011636342B2

(12) United States Patent
Lee et al.

(10) Patent No.: US 11,636,342 B2
(45) Date of Patent: *Apr. 25, 2023

(54) SEARCHING FOR MUSIC

(71) Applicant: Adobe Inc., San Jose, CA (US)

(72) Inventors: Jongpil Lee, Seoul (KR); Nicholas J. Bryan, Belmont, CA (US); Justin J. Salamon, San Francisco, CA (US); Zeyu Jin, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,011

(22) Filed: Oct. 3, 2022

(65) Prior Publication Data

US 2023/0097356 A1    Mar. 30, 2023

Related U.S. Application Data

(63) Continuation of application No. 16/823,538, filed on Mar. 19, 2020, now Pat. No. 11,461,649.

(51) Int. Cl.
*G06N 3/08* (2023.01)
*G10H 1/00* (2006.01)
*G10L 25/51* (2013.01)

(52) U.S. Cl.
CPC ............ *G06N 3/08* (2013.01); *G10H 1/0008* (2013.01); *G10H 2210/036* (2013.01);
(Continued)

(58) Field of Classification Search
CPC ................... G06N 3/08; G10H 1/0008; G10H 2210/036; G10H 2210/056; G10H 2210/076; G10L 25/51
(Continued)

(56) References Cited

U.S. PATENT DOCUMENTS 6,058,205 A * 5/2000 Bahl ................. G06F 18/24323
704/231
6,539,395 B1 * 3/2003 Gjerdingen ............. G06F 16/68
707/999.102

(Continued)

FOREIGN PATENT DOCUMENTS

BR    PI0617432         7/2011
BR    PI0617432 A2 *   7/2011
(Continued)

OTHER PUBLICATIONS

"Notice of Allowance", U.S. Appl. No. 16/823,538, dated Aug. 4, 2022, 8 pages.

(Continued)

*Primary Examiner* — Christina M Schreiber
(74) *Attorney, Agent, or Firm* — FIG. 1 Patents

(57) ABSTRACT

In implementations of searching for music, a music search system can receive a music search request that includes a music file including music content. The music search system can also receive a selected musical attribute from a plurality of musical attributes. The music search system includes a music search application that can generate musical features of the music content, where a respective one or more of the musical features correspond to a respective one of the musical attributes. The music search application can then compare the musical features that correspond to the selected musical attribute to audio features of audio files, and determine similar audio files to the music file based on the comparison of the musical features to the audio features of the audio files.

20 Claims, 10 Drawing Sheets

(52) U.S. Cl.
CPC ............... *G10H 2210/056* (2013.01); *G10H 2210/076* (2013.01); *G10L 25/51* (2013.01)

(58) Field of Classification Search
USPC ......................................... 84/612; 707/723
See application file for complete search history.

(56) References Cited

U.S. PATENT DOCUMENTS

| | | | | |
|---|---|---|---|---|
| 7,227,072 | B1* | 6/2007 | Weare | G10H 1/0008 |
| | | | | 84/649 |
| 7,381,883 | B2* | 6/2008 | Weare | G06F 16/48 |
| | | | | 84/649 |
| 7,917,514 | B2* | 3/2011 | Lawler | G06F 16/951 |
| | | | | 707/711 |
| 8,965,766 | B1* | 2/2015 | Weinstein | G06F 16/60 |
| | | | | 704/254 |
| 11,461,649 | B2* | 10/2022 | Lee | G06N 3/084 |
| 2002/0002899 | A1* | 1/2002 | Gjerdingen | G06F 16/683 |
| | | | | 707/E17.101 |
| 2003/0191764 | A1* | 10/2003 | Richards | G06F 16/683 |
| 2010/0064217 | A1* | 3/2010 | Nakajima | G06F 16/683 |
| | | | | 715/705 |
| 2010/0217755 | A1* | 8/2010 | Vignoli | G06F 16/686 |
| | | | | 707/723 |
| 2011/0153598 | A1* | 6/2011 | Kamimaeda | G06F 16/9535 |
| | | | | 707/723 |
| 2011/0184944 | A1* | 7/2011 | Kenedy | G06N 7/01 |
| | | | | 707/723 |
| 2012/0155658 | A1* | 6/2012 | Tsunoo | H04R 1/1041 |
| | | | | 381/56 |
| 2012/0284302 | A1* | 11/2012 | Takagi | G06F 16/40 |
| | | | | 707/769 |
| 2013/0255473 | A1* | 10/2013 | Abe | G10H 7/02 |
| | | | | 84/605 |
| 2013/0305904 | A1* | 11/2013 | Sumi | G10H 1/0008 |
| | | | | 84/609 |
| 2014/0040262 | A1* | 2/2014 | Winter | G06F 16/355 |
| | | | | 707/E17.046 |
| 2014/0317078 | A1* | 10/2014 | Gallagher | G06F 16/24578 |
| | | | | 707/723 |
| 2015/0317965 | A1* | 11/2015 | Horvath | G10H 1/00 |
| | | | | 84/609 |
| 2017/0124074 | A1* | 5/2017 | Cama | G06F 16/686 |
| 2019/0115000 | A1* | 4/2019 | Yoshino | G10H 1/0008 |
| 2019/0146974 | A1* | 5/2019 | Chung | G06F 16/24578 |
| | | | | 707/723 |
| 2020/0073953 | A1* | 3/2020 | Kulkarni | G06N 3/084 |
| 2020/0349921 | A1* | 11/2020 | Jansen | G06N 3/08 |
| 2021/0004402 | A1* | 1/2021 | Li | G11B 27/11 |
| 2021/0012200 | A1* | 1/2021 | Lyske | G06F 16/9024 |
| 2021/0158086 | A1* | 5/2021 | Salamon | G10L 25/51 |
| 2021/0193167 | A1* | 6/2021 | Jiang | G10L 25/51 |
| 2021/0294840 | A1* | 9/2021 | Lee | G10H 1/0008 |
| 2022/0107975 | A1* | 4/2022 | Lyske | G06F 16/783 |

FOREIGN PATENT DOCUMENTS

| | | | | |
|---|---|---|---|---|
| CN | 109492664 | | 3/2019 | |
| CN | 109492664 | A * | 3/2019 | ........... G06K 9/6256 |
| CN | 111143604 | | 5/2020 | |
| CN | 111143604 | A * | 5/2020 | |
| CN | 114023289 | | 2/2022 | |
| CN | 114023289 | A * | 2/2022 | |
| CN | 114402389 | | 4/2022 | |
| CN | 114402389 | A * | 4/2022 | ............. G06F 16/65 |
| EP | 3796306 | | 3/2021 | |
| EP | 3796306 | A1 * | 3/2021 | ........... G06F 16/634 |
| EP | 3996085 | | 5/2022 | |
| EP | 3996085 | A1 * | 5/2022 | |
| JP | 2004326050 | | 11/2004 | |
| JP | 2004326050 | A * | 11/2004 | |
| JP | 2004333605 | | 11/2004 | |
| JP | 2004333605 | A * | 11/2004 | |
| JP | 3963112 | | 8/2007 | |
| JP | 3963112 | B2 * | 8/2007 | |
| JP | 2007280342 | | 10/2007 | |
| JP | 2007280342 | A * | 10/2007 | ............. G10L 15/26 |
| JP | 4179773 | | 11/2008 | |
| JP | 4179773 | B2 * | 11/2008 | |
| WO | WO-2021180109 | A1 * | 9/2021 | ........... G06F 16/901 |
| WO | WO-20210180109 | | 9/2021 | |
| WO | WO-2022043643 | A1 * | 3/2022 | ............. G06F 40/30 |
| WO | WO-20220043643 | | 3/2022 | |

OTHER PUBLICATIONS

"Restriction Requirement", U.S. Appl. No. 16/823,538, dated Jul. 1, 2022, 6 pages.

Bentley, Jon L., "Multidimensional Binary Search Trees Used for Associative Searching", Sep. 1975, pp. 509-517.

Bertin-Mahieux, Thierry et al., "The Million Song Dataset", Jan. 2011, 6 pages.

Choi, Jeong et al., "Zero-Shot Learning for Audio-based Music Classification and Tagging", Jul. 5, 2019, 8 pages.

Datar, Mayur et al., "Locality-Sensitive Hashing Scheme Based on p-Stable Distributions", In Proceedings of SCG 2004, Jun. 2004, pp. 253-262.

He, Kaiming et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Hochreiter, Sepp et al., "Long Short-Term Memory", Neural Computation, vol. 9, No. 8 [retrieved Sep. 3, 2021]. Retrieved from the Internet <http://www.cs.cmu.edu/afs/cs/user/bhiksha/WWW/courses/deeplearning/Fall.2016/pdfs/Hochreiter97_lstm.pdf>., Nov. 15, 1997, 32 pages.

Hoffer, Elad et al., "Deep Metric Learning Using Triplet Network", Dec. 4, 2018, 8 pages.

Hu, Jie et al., "Squeeze-and-Excitation Networks", Apr. 5, 2018, 11 pages.

Jansen, Aren et al., "Unsupervised Learning of Semantic Audio Representations", Nov. 2017, 5 pages.

Kingma, Diederik P., "Adam: A Method for Stochastic Optimiziation", Dec. 22, 2014, 9 pages.

McFee, Brian, "librosa: Audio and Music Signal Analysis in Python", Jan. 2015, pp. 18-24.

Nigam, Ishan et al., "Towards Latent Attribute Discovery from Pairwise Similarities", Jan. 2019, pp. 402-410.

Park, Jiyoung et al., "Representation Learning of Music Using Artist Labels", Sep. 2018, pp. 717-724.

Sutskever, Ilya et al., "Sequence to Sequence Learning with Neural Networks", arXiv Preprint, arXiv.org [retrieved Sep. 3, 2021]. Retrieved from the Internet <https://arxiv.org/pdf/1409.3215.pdf>., Dec. 14, 2014, 9 pages.

Thong, William et al., "Cooperative Embeddings for Instance, Attribute and Category Retrieval", Apr. 2, 2019, 10 pages.

Veit, Andreas et al., "Conditional Similarity Networks", Apr. 2017, 9 pages.

Zhang, R et al., "Making Convoluational Networks Shift-Invariant Again", Jan. 2019, 15 pages.

\* cited by examiner

600

Maintain prototype feature vectors having elements that represent a respective one of a plurality of musical attributes, each of the prototype feature vectors corresponding to respective text-based tags that indicate one or more of the musical attributes, and each of the prototype feature vectors formed by averaging feature vectors that represent music files tagged with a respective one of the text-based tags
602

Receive a selected text-based tag as part of a music search request, the selected text-based tag indicating a musical attribute of the plurality of musical attributes
604

Determine a matching prototype feature vector from the prototype feature vectors based on the selected text-based tag
606

Compare the elements of the matching prototype feature vector that correspond to the musical attribute indicated by the selected text-based tag to additional feature vectors of a plurality of audio files
608

Determine, based on the compare, information of one or more of the plurality of audio files to display on the computing device
610

Obtain sets of triplets of audio files, each triplet including an anchor file having anchor content, a positive file having positive content deemed to be similar to the anchor content, and a negative file having negative content deemed to be dissimilar to the anchor content
802

Generate, with a neural network of the computing device, a respective feature vector for each audio file, the respective feature vector belonging to a vector space having a plurality of disjoint subspaces corresponding to respective musical attributes
804

Determine, for a first set of the triplets in which the anchor content and the positive content correspond to non-overlapping portions of a same audio file, and the negative content does not correspond to the same audio file, a first distance between the feature vector for the anchor file and the feature vector for the positive file and a second distance between the feature vector for the anchor file and the feature vector for the negative file, the first distance and the second distance determined over the plurality of disjoint subspaces of the vector space
806

Form a track loss term from a difference of the first distance and the second distance
808

*To block 810 in FIG. 9*

FIG. 8

SEARCHING FOR MUSIC

RELATED APPLICATION

This application is a continuation of and claims priority to U.S. patent application Ser. No. 16/823,538 filed 19 Mar. 2020, entitled "Searching for Music", the entire disclosure of which is incorporated by reference herein in its entirety.

BACKGROUND

In music replacement tasks, users may desire to search for music that is similar to another piece of music, but not the same as the piece of music. For example, it is common in movie and video productions to generate a "rough cut" video that includes copyrighted music as a placeholder. The copyrighted music can then be replaced by music that is not copyrighted, but is perceptually similar to the copyrighted music.

To search for music, a user may provide a music file as a query input to a music search system as an example of the music for which the user desires to find similar music. For instance, the query input of the music file can include a portion of a song, and the user may want to search for music that is perceptually similar to the song of the music file. Conventional music search systems can search for music based on text-based tags of the music file, such as metadata that classifies a song as jazz. The conventional music search systems can then return music in response to the query input, where the returned music includes a matching text-based tag to the text-based tag of the query music file. However, the music files returned by the conventional music search systems usually have significant variation in musical traits, such as mood, feel, tempo, etc., since matching text-based tags lacks specificity. For example, the conventional music search systems can return jazz songs that do not impart the same feel as a query input of a jazz song, because not all jazz songs have the same musical attributes that result in perceptual similarity.

The conventional music search systems can also search for music based on the query input of a music file by computing acoustic features of the music file and of music files to search over, such as by computing spectrograms and determining a correlation among the spectrograms, or based on other rudimentary transformations of the acoustic features (e.g., linear transformations). However, the music files returned in response to the query input of the music file generally lack perceptual similarity with the music file, since the conventional music search systems are limited to a global similarity along a single dimension, e.g., correlation of spectrograms. For instance, in "Learning content similarity for music recommendation" in *IEEE Transactions on Audio, Speech, and Language Processing*, Vol. 20, No. 8, October 2012, by B. McFee, L. Barrington, and G. Lanckriet, global similarity of music files is determined from a distance between histograms computed for the music files based on cepstral coefficients of the music files.

Moreover, conventional music search systems often return the same piece of music as the query music file, such as by determining audio fingerprints or watermarks of the music file. For example, the conventional music search systems may identify the music file (e.g., artist and title) of the query input from the fingerprint or watermark, and return one or more versions of the content of the query music file. However, because the music returned may be subject to a same copyright as the query music file, these conventional music search systems may not be suitable to the music replacement task.

Accordingly, conventional music search systems either search for music based on a level of specificity that is too low, such as searching by text, (in which case music is returned that generally lacks perceptual similarity with content of a query music file) or too high, such as based on audio fingerprinting, (in which case the same piece of music is returned as the query music file). Hence, conventional music search systems may not be suitable to the music replacement task, in which music is desired that is perceptually similar to a query input of a music file, but not the same music as the query music file.

SUMMARY

Techniques and systems are described for searching for music. A music search system can be implemented to search for music that is perceptually similar to music content of a query music file. The music search system can receive a music search request that includes a music file including music content, and receive a selected musical attribute from a plurality of musical attributes, such as genre, mood, instrument, and tempo. The music search system includes a music search application that can generate musical features of the music content, where a respective one or more of the musical features correspond to a respective one of the musical attributes. For example, the music search system can generate the musical features as a feature vector that includes a representation of each of the musical features, and the feature vector is partitioned into independent subspaces that each represent a respective musical attribute of the musical attributes. The music search application can compare the musical features that correspond to the selected musical attribute to audio features of audio files, such as by determining distances of the feature vector to feature vectors representing the audio features over one of the independent subspaces that corresponds to the selected musical attribute. The music search application can then determine similar audio files to the music file based on the comparison of the musical features to the audio features of the audio files, such as by comparing the distances to a distance similarity threshold, and determining the similar audio files to the music file based on the distances that are less than the distance similarity threshold.

The music search system can train a neural network to generate the feature vectors in a vector space using triplets of audio files that include an anchor file having anchor content. A positive file has positive content deemed to be similar to the anchor content, and a negative file has negative content deemed to be dissimilar to the anchor content. A first set of the triplets can be based on audio track content, so that the anchor file and the positive file can include non-overlapping portions of one audio file, and the negative file can include content from an additional audio file that is different from the one audio file. A second set of the triplets can be based on user-generated tags (e.g., tags that specify a mood as happy or sad), machine-generated tags (e.g., tempo), and/or audio features extracted from the files. For example, the music search application can extract tempo features from the music files to determine the second set of triplets in which the anchor file and the positive file have similar tempos, and the negative file has a dissimilar tempo to the anchor file and the positive file.

The music search application of the music search system can generate feature vectors for the triplets of audio files with the neural network, and determine distances of the feature vectors for the positive file and the negative file to the feature vector of the anchor file. For the first set of the triplets determined from the track data, the music search application can determine the distances over the entire vector space, to train the neural network to impose a global similarity across the vector space. For the second set of the triplets determined from the tag data, the music search application can determine the distances over a subspace of the vector space that corresponds to the musical attribute of the tag data, such as by masking the feature vectors for the second triplet with a masking function, to train the neural network to impose similarity for a specific musical attribute in the corresponding subspace of the vector space. The music search application can adjust coefficients of the neural network based on a loss function formed by combining a track loss term based on the distances of the feature vectors for the first set of the triplets and a tag loss term based on the distances of the feature vectors for the second set of the triplets.

Hence, the music search system can search for music files that are similar to a query music file according to one or more musical attributes, rather than being limited to a global similarity search along a single dimension, like conventional music search systems. Moreover, the music search system can train a single neural network to determine multi-dimensional music similarity, rather than multiple neural networks each dedicated to a single dimension of music similarity. Accordingly, the music search system is efficient and suitable to the music replacement task in which music is desired that is perceptually similar to a query music file, but not the same music as the query music file.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 illustrates a flow diagram depicting an example procedure in accordance with one or more aspects of the disclosure.

FIGS. 8 and 9 illustrate a flow diagram depicting an example procedure in accordance with one or more aspects of the disclosure.

DETAILED DESCRIPTION

Overview

Figure 1:
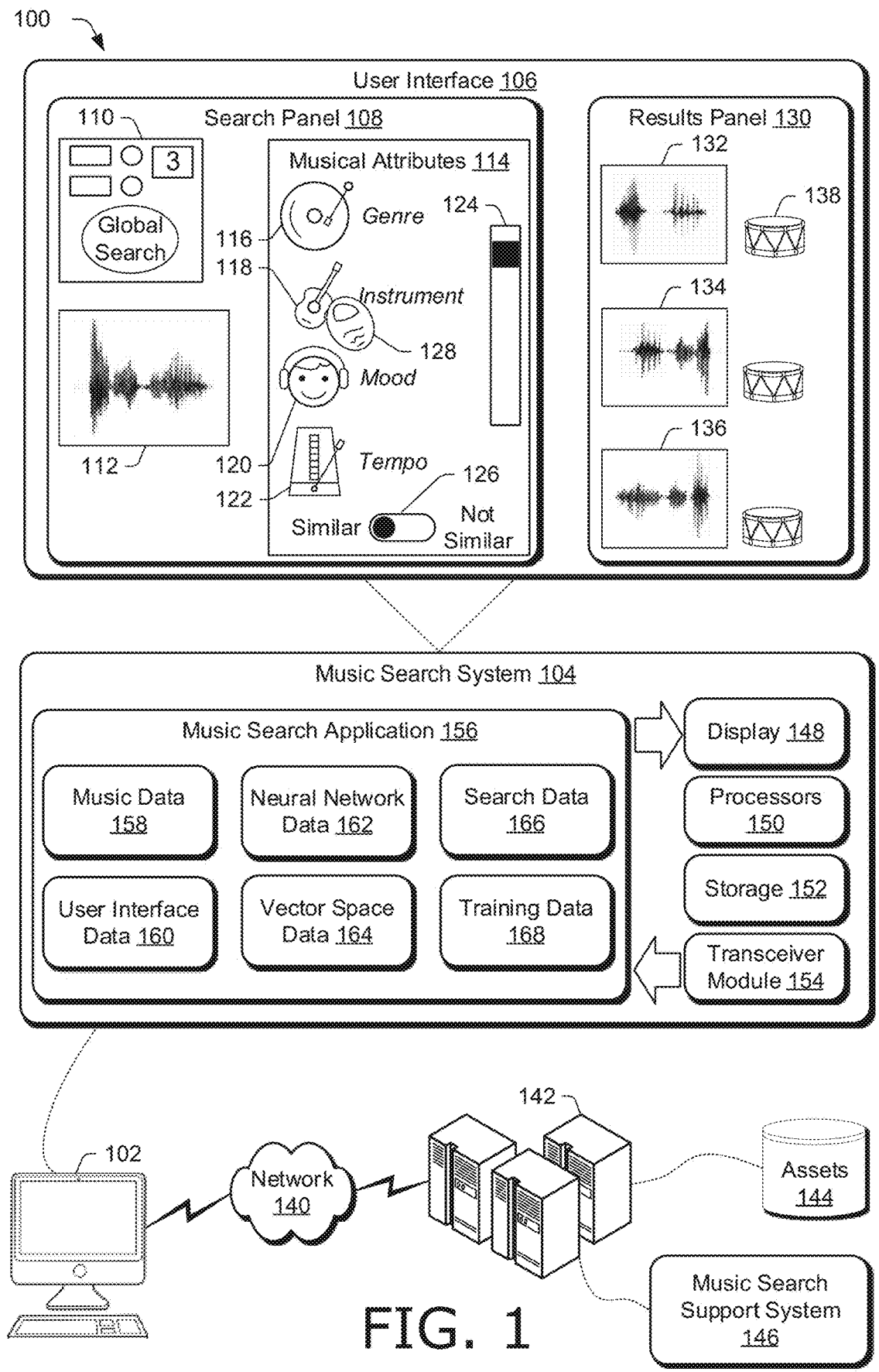
FIG. 1 illustrates a digital medium environment in an example implementation that is operable to employ techniques described herein.

Conventional music search systems are generally not suitable to a music replacement task, in which music is desired that is perceptually similar to a query piece of music, but not the same music as the query piece of music. One example of a music replacement task arises in movie productions in which a "rough cut" movie is generated that includes copyrighted music as a placeholder that is later replaced by music that is not copyrighted, but is similar to the copyrighted music. Conventional music search systems allow a degree of specificity that is generally too low or too high for the music replacement task. For instance, conventional music search systems that search for music based on text-based tags or rudimentary acoustic features of music usually return music files that lack perceptual similarity with a query music file. For example, searching for music based on a text-based tag that categorizes the genre of a query music file as jazz can return a variety of jazz songs that do not impart the same feel as the query music file, because not all jazz songs have the same musical attributes.

On the other hand, conventional music search systems that search for music based on extracting an audio fingerprint or watermark from the query music usually return music that is from a same musician of the query music. Hence, the conventional music search system can return music that is copyrighted in the same fashion as the query music, and therefore may not be suitable to the music replacement task.

Accordingly, this disclosure describes systems, devices, and techniques for searching for music based on perceptually similarity to music content of a query music file. A music search system can be implemented to search for music by comparing feature vectors of music files in a disentangled vector space that includes disjoint subspaces corresponding to respective musical attributes. For instance, the vector space can be partitioned into a plurality of disjoint subspaces, each disjoint subspace including multiple dimensions of the vector space and representing a respective musical attribute. By comparing feature vectors over one or more of the disjoint subspaces, such as by using features of the feature vectors for the one or more of the disjoint subspaces, the music search system can determine music files that have music content which is perceptually similar, dissimilar, or a combination thereof, to the music content of a query music file according to the music attributes corresponding to the one or more subspaces.

The music search system can include a neural network that generates feature vectors of music files belonging to the vector space, and can train the neural network. The music search system can use the neural network, once trained, to generate feature vectors of music files in a database of music files, and store the feature vectors in the database, so that the feature vectors can be searched to determine a music file based on perceptually similarity to music content of a query music file. In one example, the feature vectors are converted into compressed codes for efficient search and retrieval, such as via vector quantization. Because the feature vectors can be compared over one or more of the disjoint subspaces corresponding to one or more selected musical attributes, the music search system can return music files that are perceptually similar to a query music file according to the one or more selected musical attributes, rather than being limited to returning search results that may be globally similar to a query music file (e.g., across all music attributes), like many conventional music search systems.

A user may supply the query music file to the music search system, such as by uploading the query music file into a music search application of the music search system. The music search system can generate a feature vector of the query music file with the trained neural network, the feature vector belonging to the disentangled vector space. The vector space is disentangled in the sense that it has a plurality of subspaces that are disjoint and correspond to respective musical attributes. For example, the vector space is partitioned into a plurality of disjoint subspaces, each disjoint subspace including multiple dimensions of the vector space and representing a respective musical attribute, such as genre, mood, instrument, and tempo. Accordingly, the music search system can search for music files that match a particular musical attribute by measuring distances between feature vectors in the vector space over the subspace that corresponds to the particular musical attribute, such as by using contents of the feature vectors for the subspace. In other words, the distances can be restricted to the subspace of the vector space that corresponds to the particular musical attribute.

A user may specify via a user interface of the music search system one or more of the musical attributes, and to search for music files that are perceptually similar to music content of the query music file according to the specified musical attributes. In response to the user inputs, the music search system can provide one or more music files deemed to have audio content similar to the music content of the query music file according to the one or more musical attributes specified by the user. For example, a user can select genre and instrument musical attributes, and the music search system can return music files having audio content belonging to a same genre and including same or similar instruments as the query music file.

To determine the music files deemed to have audio content similar to the music content of the query music file according to the one or more musical attributes, the music search system can determine distances of the feature vector of the query music file to feature vectors of a plurality of music files, such as feature vectors that have been generated with the neural network of the music search system and stored in a database. The distances can be determined over one or more of the disjoint subspaces corresponding to one or more desired musical attributes. The music search system can return the music files that correspond to the smallest distances, such as the top-ten music files having the ten smallest distances. Additionally or alternatively, the music search system can return the music files corresponding to respective distances that are less than a distance similarity threshold. For example, for distances that are normalized between zero and one, the music search system can return the music files with feature vectors within a particular distance (e.g., 0.2) of the feature vector of the query music file. Because the distances can be determined over one or more of the disjoint subspaces corresponding to one or more selected musical attributes, the music search system can return music files that are perceptually similar to a query music file according to the one or more selected musical attributes, rather than being limited to a global similarity determined across all music attributes, like many conventional music search systems.

In one example, the music search system returns information regarding the music files returned in response to the search request, such as statistics derived from the distances. For instance, the music search system can indicate to the user a number of the music files in a database that correspond to respective distances that are less than the distance similarity threshold, a percentage of music files in the database that correspond to respective distances that are less than the distance similarity threshold, a histogram or distribution of the distances, and the like. Hence, the music search system can use the statistics derived from the distances to indicate to the user when there are little or no similar matches of the query music file in the database, when search results include music files that strongly match the query file according to one or more musical attributes, and the like. Accordingly, the music search system can indicate to the user a degree of quality of the search results.

The music search system can determine the distances over any suitable subspaces of the vector space. In one example, the music search system determines the distances over subspaces of the vector space corresponding to the one or more musical attributes indicated by the user selection. For instance, the music search system can apply a masking function to the feature vectors that excludes values of the feature vectors from the distance calculation that do not belong to the desired subspaces, and includes in the distance calculation only the values of the feature vectors that do belong to the desired subspaces. Hence, the music search system can return music files deemed to have audio content similar to the music content of the query music file according to the one or more musical attributes selected by the user and without regard to musical attributes that are not selected by the user.

Additionally or alternatively, a user may select a global search option in the user interface, and the music search system may not restrict the determination of the distances to a subset of the subspaces, but instead may determine the distances over the entirety of the vector space (e.g., over all the disjoint subspaces of the vector space). Hence, the music search system can return music files deemed to have audio content similar to the music content of the query music file in a global sense (e.g., according to all the musical attributes represented in the vector space).

In one example, the masking function can include weighting coefficients, such as a respective weighting coefficient for each of the disjoint subspaces of the vector space. For example, the music search system can assign weights to subspaces corresponding to user-selected musical attributes that are larger than a weight assigned to an additional subspace that does not correspond to a user-selected musical attribute. The music search system can then compute the distances over all the disjoint subspaces of the vector space, and weight the contribution to the distance calculation of the subspaces according to the weighting coefficients included in the masking function. Hence, the music search system can return music files deemed to have audio content similar to the music content of the query music file according to the musical attributes selected by the user based on these musical attributes being more heavily weighted in the distance calculations than musical attributes that are not selected by the user.

In one example, a user may supply multiple query music files to the music search system, select a different musical attribute for each of the query music files, and instruct the music search system to search for music files with music content that is similar, according to the respective musical attribute selected for the respective query music file, to the music content of the query music files. For instance, a user may input a first query music file and select a "genre" musical attribute, and input a second query music file and select an "instrument" musical attribute. The music search system can generate feature vectors in the vector space for the first and second query music files, and compute distances of the feature vectors over the subspaces corresponding to "genre" and "instrument" to the feature vectors of music files in a database. The music search system can return the music files of the database corresponding to distances in both subspaces of "genre" and "instrument" that are below a distance similarity threshold, and thus provide music files that are perceptually similar to the genre of the first query music file and have similar or same instruments of the second query music file.

Additionally or alternatively, when a user supplies multiple query music files as part of a search request, the music search system can generate respective feature vectors in the vector space for the multiple query music files, combine the respective feature vectors for the multiple query music files into a single feature vector, and search for music files by computing distances of feature vectors of the music files to the single feature vector. The music search system can combine the feature vectors for the multiple query music files in any suitable way, such as by averaging the feature vectors, e.g., computing a weighted average of the feature vectors in which each feature vector is assigned a respective weight. Additionally or alternatively, the music search system can assign a respective weight to each subspace for the feature vectors. Hence, the music search system can compute a weighted average of the feature vectors over the vector space, weighted averages over each of the disjoint subspaces of the vector space, or combinations thereof, to combine the feature vectors for the multiple query music files into a single feature vector. The music search system can then search for music files using the single feature vector, as described above, to determine music files that are perceptually similar to the multiple query music files provided as a search request by the user. For instance, if a user inputs a first query music file and selects a "genre" musical attribute, and inputs a second query music file and selects an "instrument" musical attribute, the music search system can generate a single feature vector from an average of the feature vectors of the first and second query music files, and compute distances of the single feature vector over the subspaces corresponding to "genre" and "instrument" to the feature vectors of music files in a database to determine music files to return as search results.

In one example, a user may select an option in the user interface of the music search system to designate to search for music that is dissimilar, rather than similar, to a query music file according to one or more musical attributes. For example, the user may select a "tempo" musical attribute in the user interface and move a switch to a position that indicates "dissimilar" The music search system can determine distances of the feature vector of the query music file to feature vectors of music files stored in a database over the subspace of the vector space corresponding to "tempo". The music search system can then return the music files corresponding to distances that are greater than a distance dissimilarity threshold. For example, for distances that are normalized between zero and one, the music search system can return the music files corresponding to distances of greater than 0.7 Hence, the music search system can return music files that have a tempo that is perceptually dissimilar to the tempo of the query music file, such as outside a range of tempos the music search system associates with the tempo of the query music file.

Additionally or alternatively, when a user desires to search for music files that are similar to a first query music file and dissimilar to a second query music file, the music search system can orthogonalize the feature vector of the first query music file from the feature vector of the second query music file. For example, the music search system can generate a projection of the feature vector of the second query music file onto the feature vector of the first query music file, and subtract the projection from the feature vector of the first query music file to form a feature vector to search for music files.

By combining user selections of musical attributes and similarity/dissimilarity, the music search system can determine music files that have musical content deemed to be similar to the musical content of the query music file according to one or more musical attributes and dissimilar to the musical content of the query music file according to one or more additional musical attributes. In one example, the music search system displays in a user interface a continuous adjuster (e.g., a slider) for each musical attribute, and the adjusters can range from a completely similar selection to a completely dissimilar selection. Hence, the music search system can allow a user continuous control over the relative importance of each musical attribute when searching for music files.

In one example, the music search system does not require a user-supplied query music file, and instead can receive a text-based tag indicating a musical attribute from a user, and search for music files based on the text-based tag. For instance, the music search system can use the text-based tag to determine a prototype feature vector from among a plurality of prototype feature vectors that have been predetermined by the music search system and stored. The music search system can generate a prototype feature vector for each possible text-based tag or musical attribute from stored feature vectors in a database, such as by determining the feature vectors in the database corresponding to the text-based tag or the musical attribute, and averaging these feature vectors to form a prototype feature vector for the text-based tag or the musical attribute. Hence, the prototype feature vector is a representative feature vector for the text-based tag or the musical attribute.

In the absence of a query music file, the music search system can use the prototype feature vector corresponding to a user-specified tag or musical attribute as the feature vector of the query music file. Hence, when the user inputs the tag or musical attribute, the music search system can retrieve the prototype feature vector for the tag or musical attribute, and determine distances in the vector space of the prototype feature vector to feature vectors of music files stored in the database. Based on the distances as described above, the music search system can return one or more of the music files having content deemed similar, dissimilar, or combinations thereof to the user-specified text-based tag or the musical attribute. The user can refine the search by selecting one of the music files returned by the music search system as a query music file, and conducting another search based on the query music file.

In an example, a user may supply one or more query music files and one or more text-based tags as part of a search request. The music search system can generate respective feature vectors for the one or more query music files and obtain respective prototype feature vectors for the one or more text-based tags. The music search system can combine the respective feature vectors for the one or more query music files and the respective prototype feature vectors for the one or more text-based tags into a single feature vector, such as by a weighted averaging of the prototype feature vectors and the feature vectors. The music search system can then search for music files using the single feature vector, as described above.

In one example, the music search system trains the neural network that is used to generate the feature vectors in the vector space. The music search system can generate triplets of audio files that are used to train the neural network. The music search system can obtain the audio files from a database of audio or music files, such as a song database available online Each triplet of audio files can include an anchor file having anchor content, a positive file having positive content deemed to be similar to the anchor content, and a negative file having negative content deemed to be dissimilar to the anchor content. The designation of the audio files as anchor, positive, or negative serves as ground truth, and the music search system can adjust the neural network based on a loss function determined from distances between feature vectors of these files in the vector space.

A first set of the triplets can be based on audio track content. For instance, the music search system can generate the anchor file and the positive file from a same audio file so that the anchor file and the positive file include non-overlapping portions of the same audio file. By generating the anchor file and the positive file from the same audio file, the music search system ensures the anchor content of the anchor file and the positive content of the positive file are perceptually similar. The music search system can generate the negative file from an additional audio file that is different from the audio file used to generate the anchor file and the positive file. Hence, the music search system can ensure the anchor content of the anchor file and the negative content of the negative file are perceptually dissimilar.

A second set of the triplets can be based on one or more tags, such as tags in metadata of the music files that specify a genre, instrument, mood, or tempo. The tags can be user-generated (e.g., specified by a user), or algorithmically generated, such as tags that are generated by an audio analysis algorithm (e.g., a tempo estimation algorithm, a genre classifier, and the like). The music search system can generate the anchor file and the positive file from different music files that share a common tag, such as a tag specifying a genre as bluegrass, and the negative file from an additional music file having a different genre tag than the common tag, such as a tag specifying the genre as other than bluegrass (e.g., classical).

In an example, the music search system can be implemented to extract audio features from a music file to determine a musical attribute for the music file, including a tempo, genre, mood, instrumentation, etc. For instance, since metadata of music files generally does not include tempo data that represents a tempo of a song (e.g., beats per minute), the music search system can extract audio features from the music files and determine a tempo. In one example, the music search system determines the anchor file and the positive file to be similar according to tempo if the tempos of the anchor file and the positive file are within a tempo threshold, such as five beats per minute. Additionally or alternatively, the music search system can determine the anchor file and the negative file to be dissimilar according to tempo if the tempos of the anchor file and the negative file are not within a tempo threshold, such as having a difference of greater than ten beats per minute.

The music search system can generate feature vectors for the triplets of audio files with the neural network, and determine distances of the feature vectors for the positive file and the negative file to the feature vector of the anchor file. For the first set of the triplets determined from the track data, the music search system can determine the distances over the entire vector space, (e.g., the plurality of disjoint subspaces corresponding to the musical attributes), to train the neural network to impose a global similarity across the vector space. The music search system can determine a track loss term for the first set of the triplets determined from the track data from the difference of the distance of the feature vector for the anchor file to the feature vector of the positive file, and the distance of the feature vector for the anchor file to the feature vector of the negative file. The distances can be computed according to an $L_2$ norm.

For the second set of the triplets determined from the tag data, the music search system can determine the distances over a subspace of the vector space that corresponds to the musical attribute of the tag data, such as by masking the feature vectors for the second set of the triplets with a masking function, to train the neural network to impose similarity for a specific musical attribute in the corresponding subspace of the vector space. The music search system can determine a tag loss term for the second set of the triplets determined from the tag data from the difference of the distance of the feature vector for the anchor file to the feature vector of the positive file, and the distance of the feature vector for the anchor file to the feature vector of the negative file. The distances can be computed according to an $L_2$ norm.

The music search system can determine a loss function from a linear combination of the track loss term and the tag loss term. In one example, the loss function is summed over a batch of sets of triplet files, each set of triplet files in the batch including a first set of triplet files having similarity and dissimilarity determined as track based, and a second set of triplet files having similarity and dissimilarity determined as tag based, as discussed above. The anchor file for the first set of triplet files and the second set of triplet files can be shared between the first set of triplet files and the second set of triplet files. The music search system can adjust coefficients of the neural network based on the loss function, such as by minimizing the loss function with a stochastic gradient descent optimizer.

Hence, the music search system can search for music files that are perceptually similar to a query music file according to one or more musical attributes, rather than being limited to a global similarity search, like conventional music search systems. Moreover, the music search system can train a single neural network to determine multi-dimensional music similarity, rather than multiple neural networks each dedicated to a single dimension of music similarity. Accordingly, the music search system is efficient and suitable to a music replacement task in which music is desired that is perceptually similar to a query music file, but not the same music as the query music file.

Term Examples

In this section, terms and variables used throughout the disclosure are described for convenience. Descriptions of these terms and variables are by way of example, and not limitation.

Anchor file $x_{anchor}$: "Anchor file" describes one of three music files making up a triplet of music files that can be used to train a neural network as described herein. The triplet can also include a positive file and a negative file. The positive file is deemed to have content similar to the content of the anchor file and the negative file is deemed to have content dissimilar to the content of the anchor file.

Anchor content: "Anchor content" describes content of an anchor file, such as a three-second duration of a song included in the anchor file.

Digital medium environment: "Digital medium environment" describes any combination of the various computing devices and resources that can be utilized to implement the techniques, systems, and devices described herein. For instance, a digital medium environment may include one or more client computing devices, a network, and one or more server computing devices.

Disentangled: "Disentangled" describes a type of vector space that is partitioned into a plurality of disjoint subspaces, each disjoint subspace including multiple dimensions of the vector space and representing a respective musical attribute for the music content of the music file. In other words, the vector space has disjoint subspaces that each correspond to a different musical attribute. For example, a length-256 vector space may include four disjoint subspaces each representing 64 different dimensions of the disentangled vector space, such as 64 dimensions corresponding to a first musical attribute (e.g., genre), 64 dimensions corresponding to a second musical attribute (e.g., instrument), 64 dimensions corresponding to a third musical attribute (e.g., mood), and 64 dimensions corresponding to a fourth musical attribute (e.g., tempo).

Distance: "Distance" describes a norm of a difference between feature vectors. For example, the distance between two feature vectors $G(x_i)$ and $G(x_j)$ corresponding to the music files $x_i$ and $x_j$, respectively, can be determined according to $D(x_i, x_j) = \|G(x_i) - G(x_j)\|$, where the notation $\|\cdot\|$ denotes any suitable norm, such as an $L_2$ norm (e.g., the square root of the sum of the squares of elements), the square of an $L_2$ norm (e.g., the sum of the squares of elements), or $L_1$ norm (e.g., the sum of the absolute values of elements). Hence, the distance between two music files can be determined as the distance between feature vectors of the music files calculated according to a norm of the difference of the feature vectors.

Distance dissimilarity threshold: "Distance dissimilarity threshold" describes a threshold that can be used to determine if music files are perceptually dissimilar Two music files having feature vectors with a distance from one another that is greater than the distance dissimilarity threshold can be deemed to have music content that is perceptually dissimilar.

Distance similarity threshold: "Distance similarity threshold" describes a threshold that can be used to determine if music files are perceptually similar Two music files having feature vectors with a distance from one another that is less than the distance similarity threshold can be deemed to have music content that is perceptually similar.

Feature vector: "Feature vector" describes a vector generated from a music file that represents low-level characteristics (or features) of music content. A feature vector can be generated with a neural network that processes a time sequence of a music file or a two-dimensional representation of the music file, such as a spectrogram, and generates the feature vector in a vector space. In one example, a neural network based on inception blocks that use different size convolutions generates length-256 feature vectors from three-second portions of a music file.

Loss function $\mathcal{L}$: "Loss function" describes a cost criterion that can be optimized (e.g., minimized) to adjust convolutional weights of a neural network. In one example, a loss function is made up of a linear combination of a tag loss term and a track loss term. The tag loss term can be determined from triplets of music files based on tag data (e.g., metadata of the music files), and the track loss term can be determined from triplets of music files based on track data (e.g., audio content of the music files). By combining the tag loss term and a track loss term, the neural network can be trained with the loss function to impose both a similarity for a specific musical attribute in a corresponding subspace of the vector space and a global similarity across the vector space.

Masking function $m_s$: "Masking function" describes a function that can be applied to a feature vector to pass some, but not all, of the elements of the feature vector. For instance, a masking function corresponding to a subspace of a vector space can be applied to a feature vector so that the result returns the elements of the feature vector corresponding to the subspace, and does not return the elements of the feature vector that do not correspond to the subspace. As an example, for the masking function $m_s$ corresponding to the subspace s applied to the feature vector $G(x)$, denoted as $G(x) \odot m_s$, the result can return the values of the feature vector $G(x)$ at the positions of the subspace s, without passing through values of the feature vector $G(x)$ at positions for subspaces other than the subspace s, e.g., these values can be zeroed by the masking function.

Musical attribute: "Musical attribute" describes any suitable characteristic of music or audio that can be used to classify a music file or an audio file. Examples of musical attributes for music include genre (e.g., country and western, jazz, classical, etc.), instrument (e.g., guitar, drums, piano, vocal, etc.), mood (e.g., upbeat, mellow, sad, etc.), tempo (e.g., ranges of perceived tempos in beats per minute), and the like. Examples of musical attributes for recordings of birds can include a class attribute of bird, such as birds of prey, song birds, and migratory birds, a gender attribute of the bird (e.g., male or female), and a time attribute, such as morning bird calls, evening bird calls, mating calls in spring, etc.

Negative file $x_{neg}$: "Negative file" describes one of three music files making up a triplet of music files that can be used to train a neural network as described herein. The triplet can also include an anchor file and a positive file. The positive file is deemed to have content similar to the content of the anchor file and the negative file is deemed to have content dissimilar to the content of the anchor file. For triplets based on tag data, the negative file can be denoted by $x_{neg}^{tag}$, and for triplets based on track data, the negative file can be denoted by $x_{neg}^{track}$.

Negative content: "Negative content" describes content of a negative file, such as a three-second duration of a song included in the negative file.

Positive file $x_{pos}$: "Positive file" describes one of three music files making up a triplet of music files that can be used to train a neural network as described herein. The triplet can also include an anchor file and a negative file. The positive file is deemed to have content similar to the content of the anchor file and the negative file is deemed to have content dissimilar to the content of the anchor file. For triplets based on tag data, the positive file can be denoted by $x_{pos}^{tag}$, and for triplets based on track data, the positive file can be denoted by $x_{pos}^{track}$.

Positive content: "Positive content" describes content of a positive file, such as a three-second duration of a song included in the positive file.

Prototype feature vector: "Prototype feature vector" describes a representative feature vector for a particular text-based tag or musical attribute. For example, a prototype feature vector can be generated to represent all songs of a particular genre, such as country and western. A prototype feature vector can be generated for each text-based tag or musical attribute from feature vectors that correspond to the text-based tag or the musical attribute, such as by averaging the feature vectors for country and western songs to form a prototype feature vector representing the genre of country and western, or averaging the feature vectors for drum solos to form a prototype feature vector representing the instrument of drums. The prototype feature vectors can be computed and stored for later use, such as when a user provides a text-based tag as a search query in lieu of a query music file.

Query music file: "Query music file" describes a music file or audio file that can be loaded into a music search system by a user for searching for music files. For instance, the user may provide the query music file to the music search system to search for music files that are perceptually similar to the query music file according to one or more musical attributes, such as having similar tempos. A query music file can include any suitable music content, such as commercially-recorded music, spoken voice (e.g., poetry and "books on tape"), environmental sounds (e.g., bird songs, whale calls, engine noises, weather patterns, etc.), and the like.

Spectrogram: "Spectrogram" describes any suitable two-dimensional representation of time and frequency content of a music file, such as a sonograph, voiceprint, or heat map. A spectrogram can be generated in any suitable way, such as with a Fourier transform, a band-pass filter bank, wavelets, combinations thereof, and the like. In one example, a spectrogram includes a log-scaled Mel-spectrogram generated from a query music file.

Subspace: "Subspace" describes some, but not all, dimensions of a vector space. For instance, a vector space having 256 dimensions can include four disjoint and equal-sized subspaces that each represent 64 different dimensions of the vector space. As an example, for dimensions 0, 1, . . . 255 of the vector space, a first subspace can correspond to dimensions 0 . . . 63, a second subspace can correspond to dimensions 64 . . . 127, a third subspace can correspond to dimensions 128 . . . 191, and a fourth subspace can correspond to dimensions 192 . . . 255.

Tag loss term $\mathcal{L}_{tag}$: "Tag loss term" describes a loss term determined from a tag-based triplet of music files (e.g., a triplet of music files in which the anchor file, the positive file, and the negative file are based on tag information of the music files, such as text-based tags embedded in metadata of the music files). The tag loss term can be computed from the difference of the distance of the positive file to the anchor file and the distance of the negative file to the anchor file, and the distances can be computed over a subspace of the vector space corresponding to the musical attribute of the text-based tag. For example, when the files of the tag-based triplet are determined from a text-based tag that indicates a genre of the music files, the distances can be computed over a subspace of the vector space corresponding to the musical attribute of genre using a masking function for the subspace. Hence, the tag loss term can be used to train a neural network to impose similarity for a specific musical attribute in a corresponding subspace of the vector space.

Text-based tag: "Text-based tag" describes data of a music file (e.g., metadata) that includes text describing any suitable characteristic of the music file, such as user-provided annotations that describe a musical attribute of genre, instrument, or mood. For instance, a text-based tag for the genre of a music file can include user-provided annotations listing one or more genres of the music file, including sub-genres, such as a genre of "jazz" and a sub-genre of "modern". In one example, a text-based tag can include data describing a tempo of a music file that has been extracted from audio content of the music file, such as based on a tempo estimation algorithm that returns a sequence of perceived tempos throughout the music file.

Track loss term $\mathcal{L}_{track}$: "Track loss term" describes a loss term determined from a track-based triplet of music files (e.g., a triplet of music files in which the anchor file, the positive file, and the negative file are based on audio content of the music files). The track loss term can be computed from the difference of the distance of the positive file to the anchor file and the distance of the negative file to the anchor file, and the distances can be computed over all disjoint subspaces of the vector space. Hence, the track loss term can be used to train a neural network to impose a global similarity across the vector space.

Triplets: "Triplets" describes sets of three music files, including an anchor file, a positive file, and a negative file, that can be used to train a neural network for searching for music. The positive file is deemed to have content similar to the content of the anchor file and the negative file is deemed to have content dissimilar to the content of the anchor file. To determine the anchor file, the positive file, and the negative file, similarity and dissimilarity can be based on tag data or track data. When based on tag data (e.g., metadata of the music files), the triplet can be referred to as a tag-based triplet, and when based on track data (e.g., audio content of the music files), the triplet can be referred to as a track-based triplet. In one example, the music files of a triplet each include three seconds of audio content.

Vector space: "Vector space" describes a space in which vectors of real-valued numbers, such as feature vectors of music files, belong. A vector of a vector space can be added to another vector in the vector space, and the result belongs to the vector space. A vector of a vector space can also be multiplied by a real-valued scalar, and the result belongs to the vector space. The vector space can include any suitable number of dimensions, such as 256 dimensions. The vector space can be a disentangled vector space in the sense that disjoint subspaces of the vector space can correspond to different respective musical attributes. For example, a disentangled vector space of 256 dimensions may include four disjoint subspaces each representing 64 different dimensions of the disentangled vector space, such as 64 dimensions corresponding to a first musical attribute (e.g., genre), 64 dimensions corresponding to a second musical attribute (e.g., instrument), 64 dimensions corresponding to a third musical attribute (e.g., mood), and 64 dimensions corresponding to a fourth musical attribute (e.g., tempo).

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 depicted as a desktop computer, which is an example computing device. The computing device 102 can generally include any suitable type of computing device, such as a mobile phone, tablet, laptop computer, desktop computer, goggles, glasses, camera, digital assistant, image editor, non-linear editor, digital audio workstation, copier, scanner, client computing device, and the like. Hence, the computing device 102 may range from full resource devices with substantial memory and processor resources (e.g., personal computers, game consoles, etc.) to low-resource devices with limited memory or processing resources (e.g., mobile devices).

Notably, the computing device 102 can include any suitable number of computing devices, such as one or more computing devices, (e.g., a smart phone connected to a tablet). Furthermore, discussion of one computing device of the computing device 102 is not limited to that one computing device, but generally applies to each of the computing devices included in the computing device 102. Furthermore, the computing device 102 may be representative of one or a plurality of different devices connected to a network that perform operations "over the cloud" as further described in relation to FIG. 10. In one example, the computing device 102 includes multiple computing devices communicatively coupled to each other, such as with a low power wireless communication standard (e.g., a Bluetooth® protocol). Hence, an asset (e.g., music file, digital image, video, text, drawing, artwork, document, file, and the like) generated, processed, edited, or stored on one device of the computing device 102 (e.g., a desktop computer) can be communicated to, and displayed on and processed by another device of the computing device 102 (e.g., a tablet).

Various types of input devices and input instrumentalities can be used to provide input to the computing device 102. For example, the computing device 102 can recognize input as being a mouse input, drawing-tool input, stylus input, touch input, input provided through a natural user interface, and the like. Thus, the computing device 102 can recognize multiple types of gestures including touch gestures and gestures provided through a natural user interface. In one example, the computing device 102 includes speech recognition, identification, and synthesis functionalities, microphones, and speakers that allow the computing device 102 to communicate with a user in a conversation, such as in a user conversation.

The computing device 102 includes a music search system 104 for searching for music. The music search system 104 can generate a user interface 106 that is displayable on a display device of the computing device 102. The user interface 106 includes a search panel 108 for configuring a search for music based on an example of music. The search panel 108 includes a control panel 110 that can include any suitable control or option regarding the user interface 106. The control panel 110 is generally shown as a collection of rectangles and circles representing sliders, buttons, tabs, switches, knobs, and the like which a user may select, adjust and otherwise use for searching for music and control the user interface 106. Examples of control options in the control panel 110 include adjusters and selectors for initiating a global search over all disjoint subspaces of a vector space (e.g., a "global search" button), determining how many music files are returned in a search, setting thresholds (e.g., a distance similarity threshold, a distance dissimilarity threshold, etc.), saving music files, editing music files (e.g., an equalizer to adjust frequency bands of a music file), setting a size of icons displayed in the user interface 106, setting a number of musical attributes that are displayed in the user interface 106, and the like.

The search panel 108 also includes a representation of a query music file 112, which is an example of a music file or audio file that can be loaded into the music search system 104 by a user for searching for music files. For instance, the user may provide the query music file 112 to the music search system 104 to search for music files that are perceptually similar to the query music file 112. The user interface 106 can display any suitable representation of the query music file 112 in the search panel 108, such as a spectrogram, a plot of an amplitude versus time, a histogram, a frequency response, etc.

The search panel 108 also includes a musical attributes panel 114 for configuring a search for music based on the query music file 112. The musical attributes panel 114 can display musical attributes that can be selected by a user to instruct the music search system 104 how to search for music based on the query music file 112. For instance, a user can select a musical attribute depicted in the musical attributes panel 114 to configure the music search system 104 to search for music files that are perceptually similar (or dissimilar) to the selected musical attribute. In the example in FIG. 1, the musical attributes panel 114 displays a turntable icon 116 representing a "genre" musical attribute, a guitar icon 118 representing an "instrument" musical attribute, a face icon 120 representing a "mood" musical attribute, and a metronome icon 122 representing a "tempo" musical attribute. Examples of genres represented by the turntable icon 116 include rock, jazz, classical, gospel, bluegrass, etc. Examples of instruments represented by the turntable icon 116 include guitar, piano, drum, harp, saxophone, mandolin, etc. Examples of mood represented by the face icon 120 include mellow, sad, happy, dance, etc. Examples of tempo represented by the metronome icon 122 include ranges of beats per minute, such as 40-50 beats per minute, 80-100 beats per minute, 120-140 beats per minute, etc.

The musical attributes panel 114 includes a slider 124 usable to scroll through musical attributes that are displayed in the musical attributes panel 114. For example, a user may slide the adjuster of the slider 124 down to cause musical attributes below the metronome icon 122 that are hidden in FIG. 1 to be displayed in the musical attributes panel 114. This may cause one or more of the musical attributes displayed in the musical attributes panel 114 to become hidden. For instance, as a user slides the adjuster of the slider 124 down, the turntable icon 116 may be moved out of view of the musical attributes panel 114 so it becomes hidden when a musical attribute below the metronome icon 122 becomes visible. A user may also slide the adjuster of the slider 124 up to cause musical attributes above the turntable icon 116 that are hidden to be displayed in the musical attributes panel 114. Hence, a user may scroll through the available musical attributers in the musical attributes panel 114 using the slider 124.

The musical attributes panel 114 also includes a selector 126 for selecting between a "similar" option and a "not similar" (e.g., dissimilar) option. A user may move the selector 126 to the "similar" position and select one or more of the musical attributes displayed in the musical attributes panel 114 to configure the music search system 104 to search for music files that are deemed to have music content similar to the music content of the query music file 112 according to the selected musical attributes. Additionally or alternatively, a user may move the selector 126 to the "not similar" position and select one or more of the musical attributes displayed in the musical attributes panel 114 to configure the music search system 104 to search for music files that are deemed to have music content dissimilar to the music content of the query music file 112 according to the selected musical attributes. As an example, a user may move the selector 126 to the "similar" position and select the turntable icon 116 denoting genre, and then move the selector 126 to the "not similar" position and select the face icon 120 denoting mood to configure the music search system 104 to search for music files that have music content similar to the music content of the query music file 112 according to genre and dissimilar to the music content of the query music file 112 according to mood.

Additionally or alternatively to the selector 126, the musical attributes panel 114 can display a continuous adjuster (e.g., a slider) for each musical attribute (not shown in FIG. 1). The adjusters can range from a "completely similar" selection to a "completely dissimilar" selection. A center selection of the continuous adjuster can correspond to a "don't care" selection in which the musical attribute is not important to the user. Hence, the music search system 106 can allow a user continuous control over the relative importance of each musical attribute displayed in the musical attributes panel 114 when searching for music.

In the example in FIG. 1, a user has moved the selector 126 to the "similar" position and selected the guitar icon 118 representing the "instrument" musical attribute, illustrated by the selection 128. For instance, the selection 128 can represent a user touching a touchscreen of the computing device 102 to select the guitar icon 118, the user clicking on the guitar icon 118 with a mouse, etc. A user has also entered a value of "3" in the control panel 110 to configure the music search system 104 to return three music files as search results that have music content similar to the music content of the query music file 112 according to the "instrument" musical attribute.

Based on these user selections, the user interface 106 can display a results panel 130 for displaying search results. Since the user has instructed the music search system 104 to return three music files that have music content similar to the music content of the query music file 112 according to the "instrument" musical attribute, the results panel 130 displays representations of a first music file 132, a second music file 134, and a third music file 136. These music files can be returned by the music search system 104 based on comparing distances of feature vectors of these music files to a feature vector for the query music file 112 in a subspace of a disentangled vector space, the subspace corresponding to the "instrument" musical attribute (discussed below in more detail with regards to FIG. 3).

The results panel 130 also displays a drum icon 138 next to each of the first music file 132, the second music file 134, and the third music file 136 to indicate that these music files are perceptually similar to the query music file 112 according to the "instrument" musical attribute. In one example, the drum icon 138 is selected from among a plurality of different icons of musical instruments based on the music search system 104 determining that the predominant instrument in the query music file 112 is a drum. For instance, the query music file 112 may include a drum solo. To determine that the predominant instrument in the query music file 112 is a drum, the music search system 104 can compare the feature vector of the query music file 112 to prototype feature vectors corresponding to respective musical instruments. For example, the music search system 104 can determine the prototype feature vectors as representative feature vectors for respective musical instruments, such as by averaging multiple feature vectors corresponding to a particular music attribute to form the prototype feature vector for the musical attributes, such as a first prototype feature vector for a drum solo formed by averaging feature vectors of music files having drum solos, a second prototype feature vector for a guitar solo formed by averaging feature vectors of music files having guitar solos, etc.

A user can select any of the first music file 132, the second music file 134, or the third music file 136, and play the music content of the selected file. For instance, a user can click on the displayed representation of one of the music files in the results panel 130 and cause the computing device 102 to play the music content of the selected music file through a loudspeaker of the computing device 102. In one example, a user can select one of the first music file 132, the second music file 134, or the third music file 136 and designate the selection as a new query music file (e.g., to replace the query music file 112). The user can then conduct another search for music files that have music content perceptually similar to the music content of the new query music file. Hence, the user may continue to refine the search in an iterative way, by designating a music file returned by the music search system 104 as a new query music file for a next iteration in the search.

Though the example illustrated in FIG. 1 is described with respect to music files, the systems and procedures described herein are not limited to music files having commercially-produced music content. Rather, music files can include any suitable audio files having content that can impart perceptual differences among users over multiple dimensions. For example, music files can include audio files including spoken words, such as poetry. In this example, the musical attributes can include audio attributes of the poetry, such as a genre, meter, speaker gender, language, etc. Examples of genre for poetry include a Shakespearean genre indicating Shakespearean-like poems, an Elizabethan genre indicating poems of the Elizabethan age, a modern genre indicating poems pertaining to modern subject matter, a protest genre indicating poems of protest, etc. Examples of meter for poetry include iambic pentameter, trimeter, iambic tetrameter, dactylic tetrameter, etc.

In another example, music files can include audio files including recordings of environmental sounds, such as bird calls, engine noises, weather patterns (storms, sun, wind, beach, etc.), and the like. For instance, musical attributes for bird calls can include a class attribute of bird, such as birds of prey, song birds, and migratory birds, a gender attribute of the bird (e.g., male or female), and a time attribute, such as morning bird calls, evening bird calls, mating calls in spring, etc. Musical attributes for engine noises can include a vehicle attribute, such as a car, truck, tractor, boat, and plane, a fuel attribute (e.g., diesel, gasoline, propane, electric, jet fuel, etc.), a displacement attribute categorizing a size of the engine, and a motion attribute, such as to indicate a speed of the vehicle housing the engine when the recording was made. Hence, an audio engineer can use the music search system 104 to search a database of recordings of engines and return audio files similar to a query recording based on one or more the musical attributes for engine noises.

The computing device 102 is also coupled to a network 140, which communicatively couples the computing device 102 with a server 142. The network 140 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

The server 142 may include one or more servers or service providers that provide services, resources, assets, or combinations thereof to the computing device 102. Services, resources, or assets may be made available from the server 142 to the music search system 104, and stored at assets 144 of the server 142. For instance, feature vectors of music files, the music files, a neural network to generate feature vectors, triplets of audio files for training the neural network, etc. can be stored at the assets 144 and made available to the computing device 102. Hence, the music search system 104 can include any suitable asset stored at the assets 144 of the server 142. In one example, the assets 144 store feature vectors for efficient search and retrieval, such as by converting the feature vectors to compressed codes, a vector quantization that indexes the feature vectors, combinations thereof, and the like.

The server 142 can include a music search support system 146 configurable to receive signals from the computing device 102, process the received signals, and send the processed signals to the computing device 102 to support searching for music. For instance, the computing device 102 may obtain a query music file for conducting a music search by example, such as the query music file 112, generate a feature vector for the query music file, and communicate the feature vector for the query music file along with any suitable data to the server 142. The server 142, using the music search support system 146, may determine distances of feature vectors of a plurality of music files to the feature vector of the query music file, the distances determined in a disentangled vector space having a plurality of disjoint subspaces corresponding to respective musical attributes. For instance, the vector space can be partitioned into a plurality of disjoint subspaces, each disjoint subspace including multiple dimensions of the vector space and representing a respective musical attribute. The server 142 can then send the distances to the computing device 102, which can provide indications of one or more of the music files as search results based on the distances, such as ten of the music files corresponding to the ten smallest distances. Accordingly, the music search support system 146 of the server 142 can include a copy of the music search system 104.

The computing device 102 includes the music search system 104 for searching for music. The music search system 104 can be a standalone system, or a plug-in to an additional system. For example, the music search system 104 can be included in a music, image, or video editing system, such as by incorporating the music search system 104 into Adobe Premiere Pro®. In one example, the music search system 104 is included in a web browser, such as Mozilla Firefox®, Google Chrome®, or Microsoft Edge®.

The music search system 104 includes a display 148, which can expose any suitable data used by or associated with the music search system 104. In one example, the display 148 displays a user interface for searching for music, such as the user interface 106. The display 148 can include any suitable type of display, such as a touchscreen, liquid crystal display, plasma display, head-mounted display, wearable display, projector and screen, and the like.

The music search system 104 also includes processors 150, which can include any suitable type of processor, such as a graphics processing unit, central processing unit, digital signal processor, processor core, combinations thereof, and the like. Hence, the music search system 104 may be implemented at least partially by executing instructions stored in storage 152 on the processors 150. For instance, the processors 150 may execute portions of music search application 156. The storage 152 can be any suitable type of storage accessible by or included in the music search system 104. The storage 152 stores data and provides access to and from memory included in the storage 152 for any suitable type of data. For instance, the storage 152 can include data used by or generated by the music search application 156.

Furthermore, the music search system 104 includes a transceiver module 154, which can be implemented to transmit and receive data using any suitable type and number of communication protocols. For instance, data within the music search system 104 can be transmitted to the server 142 with the transceiver module 154. Furthermore, data can be received from the server 142 with the transceiver module 154. The transceiver module 154 can also transmit and receive data between computing devices of the computing device 102. In one example, the transceiver module 154 includes a low power wireless communication standard (e.g., a Bluetooth® protocol) for communicating data between computing devices of the computing device 102.

The music search system 104 also includes the music search application 156 that represents functionality configured to search for music, such as based on an example of music (e.g., a query music file). The music search application 156 can be implemented as any type of module or component in software (e.g., as software instructions that are executable with the processors 150), hardware, or combinations thereof, as a standalone application or as a module or component of another device application, and in any type of computing device. The music search application 156 can also include or have access to any suitable data for searching for music, including music data 158, user interface data 160, neural network data 162, vector space data 164, search data 166, and training data 168. In one example, this data is stored in the storage 152 and made available to the music search application 156 and the music search system 104.

The music data 158 can include any suitable data related to music, such as music files (e.g., audio files that include audio or music content), feature vectors of music files, metadata of music files, such as tags indicating musical attributes, and a tempo of a music file extracted by the music search system 104. The music data 158 can also include prototype feature vectors that are representative, example feature vectors of music files having certain musical attributes or that are tagged with a certain tag, such as a prototype feature vector representing a country-and-western genre, a prototype feature vector representing piano solos, a prototype feature vector representing mellow moods, and the like. The music data 158 can also include representations of music files, such as spectrograms, amplitudes over time, a histogram of any suitable data of a music file, a frequency response, dynamic range, and the like.

The user interface data 160 can include any suitable data related to a user interface of the music search system 104, such as user preferences (e.g., font size and style, locations and sizes of panels presented in a user interface, or preferred by users, user-preferred representations of music files, and the like), data of users operating a user interface (e.g., user histories of searches including user-selections of query music files, musical attributes, parameters configuring a search for music, and user profiles of user features, such as gender, age, occupation, location, etc.), user interface configurations (e.g., different layouts, language options, etc.), and controls and adjusters (e.g., sliders, lists of user gestures, etc.) to control a user interface. The user interface data 160 can also include music files consumed or displayed via a user interface, such as a query music file, search results including music files deemed similar or dissimilar to a query music file, and the like. The user interface data 160 can also include user interface version numbers, lists of operating systems supported by various user interfaces, toolbar icons, speech libraries for voice-actuated commands and gestures, and the like.

The neural network data 162 can include any suitable data related to a neural network of the music search system 104, such as architecture definitions of a neural network, including filter descriptions, connections of filters, connections of layers, descriptions of inception blocks, sizes of convolutions (e.g., filter sizes and numbers of filters), orders of data concatenated within a neural network, decimation rates, and values of coefficients in a neural network (e.g., convolution coefficients). The neural network data 162 can also include values of a loss function, weighting parameters of a loss function (e.g., respective weights of a track loss term and a tag loss term), normalization parameters, activation functions, and the like. The neural network data 162 can also include feature vectors generated by a neural network, audio files provided as input to a neural network, triplets of audio files used to train a neural network, spectrograms of music files, and definitions of transformations used to generate the spectrograms.

The vector space data 164 can include any suitable data related to a vector space used by the music search system 104 (e.g., a disentangled vector space), such as feature vectors belonging to the vector space, distances between feature vectors in the vector space, and definitions of the vector space including definitions of disjoint subspaces of the vector space corresponding to respective musical attributes, such as designators for dimensions of the vector space assigned to different musical attributes. The vector space data 164 can also include descriptions of masking functions for respective musical attributes that when applied to a feature vector belonging to a disentangled vector space, can return the elements of the feature vector belonging to the subspace of the vector space that corresponds to the respective musical attribute associate with the masking function applied.

The search data 166 can include any suitable data related to search results returned by the music search system 104, such as music files returned as search results, and distances between the feature vector of a query music file and the feature vectors of music files searched over by the music search system 104, the distances computed over at least one subspace of a vector space having disjoint subspaces corresponding to respective musical attributes. The search data 166 can also include a ranking of music files returned as search results by the music search system 104, such as an ordered list of the returned music files in an order according to the distances. For instance, music files corresponding to larger distances relative to the query music file can be at one end of the ranked, ordered list, and music files corresponding to smaller distances relative to the query music file can be at the other end of the ranked, ordered list. In one example, the search data 166 includes representations of music files returned by the music search system 104, such as filenames, icons (e.g., different icons corresponding to different instruments in the music files, different icons representing fast or slow tempos, different icons representing jazz or rock genres, etc.), spectrograms, plots of amplitude versus time, and the like.

The search data 166 can also include music files searched over by the music search system 104 (e.g., music files stored in a database of music files, such as copyright-free music files), music files deemed to have audio content similar to the music content of a query music file according to at least one musical attribute, and music files deemed to have audio content dissimilar to the music content of a query music file according to at least one musical attribute. In one example, the search data 166 includes music files deemed to have audio content similar to the music content of a query music file according to at least one musical attribute. Additionally or alternatively, the search data 166 can include music files deemed to have audio content dissimilar to the music content of the query music file according to at least one additional musical attribute.

The training data 168 can include any suitable data related to a neural network the music search system 104, such as a loss function, a tag loss term, a track loss term, combining weights used to combine a tag loss term and a track loss term to form a loss function, a tuning parameter indicating a margin factor, and distances between feature vectors in a vector space used to construct a loss term, e.g., a tag loss term or a track loss term. The training data 168 can also include a description of a norm used to determine the distances between the feature vectors, subspaces of the vector space over which the distances are determined, a masking function that when applied to a feature vector belonging to the vector space, can return the elements of the feature vector belonging to the subspace of the vector space that corresponds to the musical attribute associated with the masking function applied, and masked feature vectors. The training data 168 can also include coefficients (e.g., convolutional coefficients of a neural network used to generate feature vectors), error terms and training updates used to update the coefficients, a stepsize of an adaptive algorithm, regressor data used to update the coefficients, and a block size that determines a number of samples to accumulate when forming an error term or gradient of a loss function.

The training data 168 can also include training data used to train a neural network, including triplets of music files and audio files used to generate the triplets. Each triplet can include an anchor file having anchor content, a positive file having positive content deemed to be similar to the anchor content, and a negative file having negative content deemed to be dissimilar to the anchor content. In one example, the triplets are based on audio track content, so that the anchor file and the positive file can include non-overlapping portions of a same audio file, and the negative file can include content from an additional audio file that is different from the same audio file. The training data 168 can include indicators of the same audio file used to generate the anchor file and the positive file, such as timestamps of a song corresponding to the anchor content and the positive content. Additionally or alternatively, the triplets can be based on one or more tags, such as tags in metadata of the music files that specify a musical attribute. In an example, the tags are generated by the music search system 104 by extracting audio features from the music files. For instance, the tags may represent a tempo of a music file. The training data 168 can include the tags used to determine the triplets and the musical attributes indicated by the tags.

Training a Neural Network of a Music Search System

Figure 2:
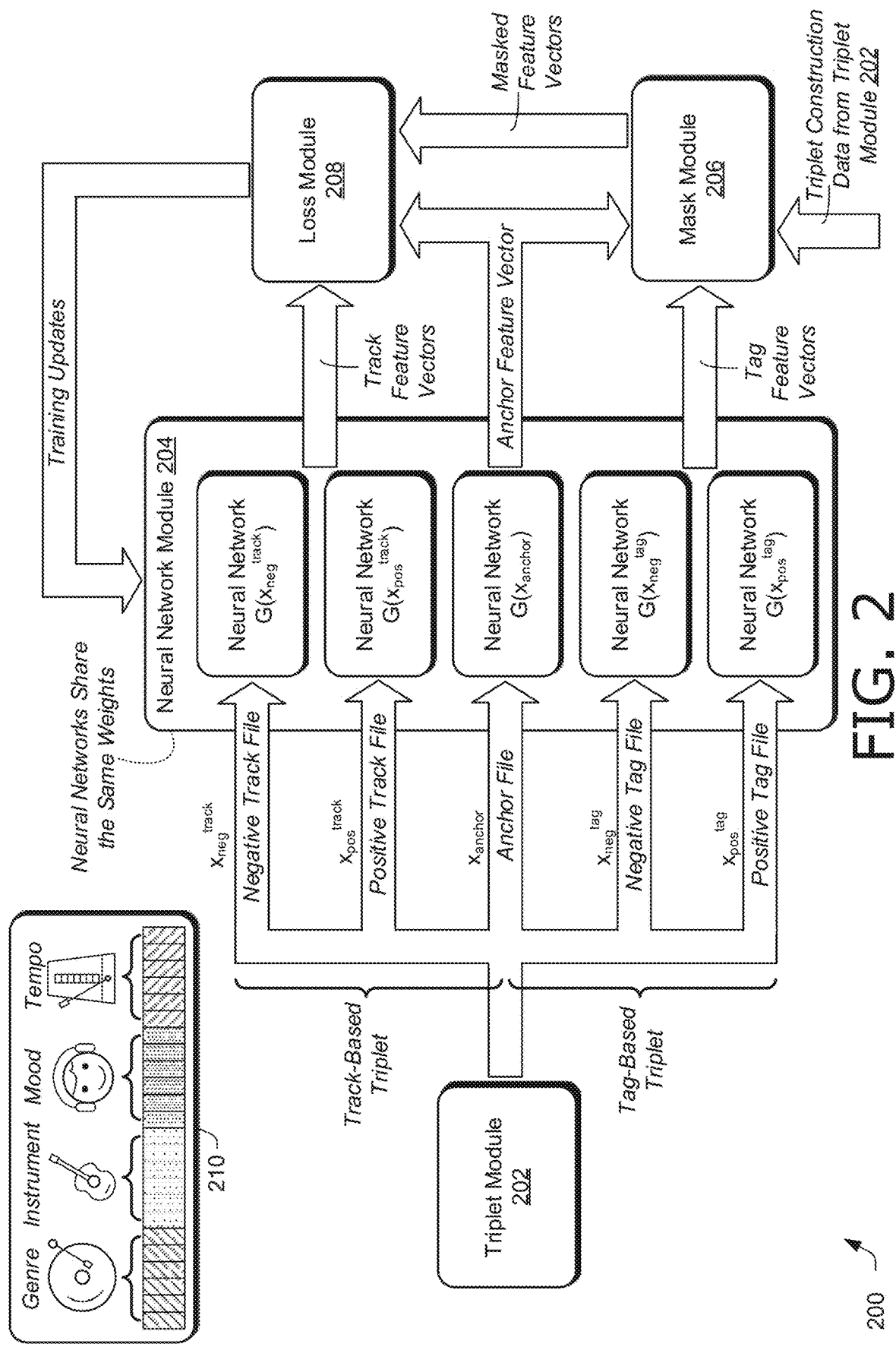
FIG. 2 illustrates an example system usable for training a neural network of a music search system in accordance with one or more aspects of the disclosure.

FIG. 2 illustrates an example system 200 usable for training a neural network of a music search system in accordance with one or more aspects of the disclosure. In this implementation, system 200 includes triplet module 202, neural network module 204, mask module 206, and loss module 208. These modules can be implemented as any type of module or component in software (e.g., as software instructions that are executable with a processing system), hardware, or combinations thereof, as a standalone application or as a module or component of another device application, and in any type of computing device. The system 200 is one example of the music search system 104 that can be constructed using these modules. For instance, signals can be redefined, and modules can be modified, combined, divided, added, or removed to form a modified system, without altering the functionality of the system 200. Accordingly, such modified systems are considered to be within the scope of the disclosure. Furthermore, for simplicity, the system 200 is limited to these modules and a description of some of their interconnects. The system 200 can, however, include any suitable signals and communications between modules omitted for simplicity. Such signals can include system clocks, counters, music file indicators, sequence indicators, reset signals, and the like.

Moreover, the system 200 can be implemented on any suitable device or devices. In one example, the system 200 is implemented on one computing device (e.g., the server 142 in FIG. 1). In another example, the system 200 is implemented on more than one computing device. For instance, parts of the system 200 can be implemented by a first computing device, such as the computing device 102 in FIG. 1, and other parts of the system 200 can be implemented by an additional computing device, such as a server (e.g., the server 142 in FIG. 1). The server can be remote, e.g., because it is not collocated with the first computing device. A server may be implemented to receive signals of the system 200 from a computing device (e.g., the computing device 102), process the received signals, such as with the music search support system 146, and transmit results of the processing back to the computing device. Hence, the music search support system 146 of the server 142 in FIG. 1 can include the system 200.

Additionally or alternatively, parts of the system 200 can be implemented by an additional computing device that is collocated with a first computing device. For instance, one device of the computing device 102 can be a first computing device, and another device of the computing device 102 can be an additional, collocated computing device. The first computing device and the additional computing device can be operated by one or more users. Hence, the system 200 can provide for multiple users within an environment to share data included in the system 200.

The triplet module 202 can be implemented to generate triplets of music files (e.g., audio files), including triplets of music files based on track data and triplets of music files based on tag data. The triplet module 202 can obtain music files from any suitable location to generate the triplets of music files. In one example, the triplet module 202 obtains music files from a database of music files, such as an online database of publicly available music files, a database maintained in the assets 144 of the server 142 in FIG. 1, and the like. The triplet module 202 can generate each triplet to include an anchor file having anchor content, a positive file having positive content deemed to be similar to the anchor content, and a negative file having negative content deemed to be dissimilar to the anchor content. The anchor file, the positive file, and the negative file can be of any suitable duration. In one example, the triplet module 202 generates the anchor file, the positive file, and the negative file so that they each include three seconds of content.

To generate triplets based on track data, the triplet module 202 can generate the triplets based on audio track content. For instance, the triplet module 202 can generate the anchor file and the positive file from a same audio file so that the anchor file and the positive file include non-overlapping portions of the same audio file. As an example, the triplet module 202 can generate the anchor file from data between timestamps 5 seconds and 8 seconds of an audio file, and the positive file from data between timestamps 16 seconds and 19 seconds of the audio file. By generating the anchor file and the positive file from the same audio file, the triplet module 202 ensures the anchor content of the anchor file and the positive content of the positive file are perceptually similar. The triplet module 202 can generate the negative file from an additional audio file that is different from the audio file used to generate the anchor file and the positive file. Hence, the triplet module 202 can ensure the anchor content of the anchor file and the negative content of the negative file are perceptually dissimilar.

To generate triplets based on tag data, the triplet module 202 can generate the triplets based on one or more tags, such as user-generated tags in metadata of the music files that specify a genre, instrument, or mood. The triplet module 202 can generate the anchor file and the positive file from different music files that share a common tag, such as a tag specifying a genre as bluegrass. The triplet module 202 can generate the negative file from an additional music file having a tag that specifies a different attribute than that specified by the common tag, such as a genre other than bluegrass (e.g., classical).

Since metadata of music files generally does not include tempo data that represents a tempo of a song (e.g., beats per minute), the triplet module 202 can extract audio features from the music files and determine a tempo from the extracted audio features. For instance, the triplet module 202 can determine one or more tempos in beats per minute using a tempo estimation algorithm, such as a machine learning algorithm trained with different tempo and speed related features, an algorithm based on spectral analysis of the music file, or an algorithm based on timing features of the music file, and generate a tag in the metadata of the music file that indicates the estimated tempos of the music file. The tempos can be represented in any suitable way, such as an average perceived tempo, a probability density function of tempos, a series of tempos, and the like. The triplet module 202 can then determine the anchor file and the positive file to be similar according to tempo if the tempos of the anchor file and the positive file are within a tempo threshold, such as five beats per minute. Additionally or alternatively, the triplet module 202 can determine the anchor file and the negative file to be dissimilar according to tempo if the tempos of the anchor file and the negative file are not within a tempo threshold, such as having a difference of greater than ten beats per minute.

The triplet module 202 provides a first triplet of music files based on track data and a second triplet of music files based on tag data to the neural network module 204. In one example, the triplet module 202 generates the first triplet and the second triplet as sharing a same anchor file, denoted by $x_{anchor}$ in FIG. 2. The positive file and the negative file for the first triplet of music files based on track data are denoted by the positive track file $x_{pos}^{track}$ and the negative track file $x_{neg}^{track}$, respectively, and the positive file and the negative file for the second triplet of music files based on tag data are denoted by the positive tag file $x_{pos}^{tag}$ and the negative track file $x_{neg}^{tag}$, respectively. The triplet module 202 also provides triplet construction data to the mask module 206, which can include any suitable data used by the triplet module 202 to generate a tag-based triplet, such as a text-based tag or indication of a condition or audio feature used to generate the tag-based triplet, such as an indicator of tempo when the tag-based triplet is based on a tempo determined from audio features extracted from a music file.

Figure 4:
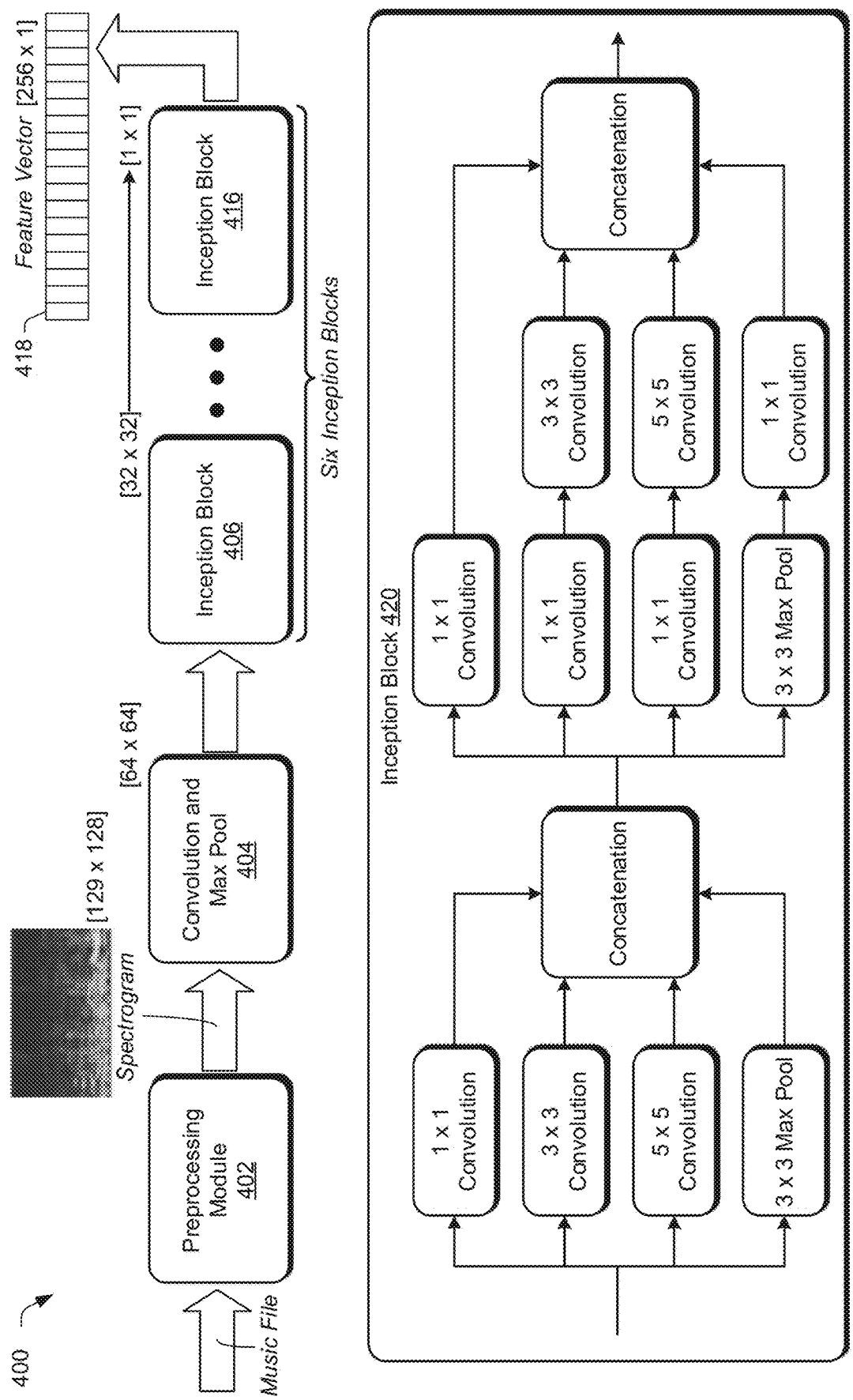
FIG. 4 illustrates an example neural network in accordance with one or more aspects of the disclosure.

The neural network module 204 can be implemented to generate feature vectors from music files received from the triplet module 202 using a neural network denoted generally by the operator $G(\cdot)$. The neural network module 204 can include any suitable neural network to generate feature vectors from music files, such as an encoder with convolutional layers, a residual neural network, a squeeze and excitation network, or an inception network. In one example, the neural network module 204 includes an inception network as illustrated in FIG. 4 (discussed below in more detail).

The neural network module 204 can receive a first triplet of music files based on track data and a second triplet of music files based on tag data from the triplet module 202, and for each music file, generate a respective feature vector using the neural network GO. In FIG. 2, the neural network module 204 is illustrated with five separate instantiations of the neural network, with each instantiation processing one of the music files provided by the triplet module 202. Each of the five separate instantiations of the neural network of the neural network module 204 share the same weights and architecture, e.g., the five separate instantiations are copies of one another. The anchor file $x_{anchor}$ is shared between the triplet based on track data and the triplet based on tag data, and the neural network module 204 generates a feature vector from the anchor file, denoted as $G(x_{anchor})$. For the triplet based on track data, the neural network module 204 generates track feature vectors from the negative track file and the positive track file of the triplet, denoted as $G(x_{neg}^{track})$ and $G(x_{pos}^{track})$, respectively. For the triplet based on tag data, the neural network module 204 generates tag feature vectors from the negative tag file and the positive tag file of the triplet, denoted as $G(x_{neg}^{tag})$ and $G(x_{pos}^{tag})$, respectively.

The neural network module 204 generates feature vectors that belong to a vector space 210. The vector space 210 is disentangled in the sense that it includes a plurality of subspaces that are disjoint and correspond to respective musical attributes. In other words, the vector space 210 is partitioned into a plurality of disjoint subspaces, each disjoint subspace including multiple dimensions of the vector space and representing a respective musical attribute. For instance, the vector space 210 includes a plurality of disjoint subspaces that correspond to the music attributes genre, mood, instrument, and tempo. The subspaces of the vector space 210 can be defined in any suitable way. In one example, the subspaces are contiguous. For example, a first subspace can correspond to indices 0 . . . N−1 of the vector space 210 for an integer N, and a second subspace can corresponds to indices N . . . 2N−1. Additionally or alternatively, the subspaces can be interleaved over the vector space 210. For example, a first subspace can correspond to indices 0:M:L, where M denotes the number of subspaces of the vector space 210 (e.g., a number of musical attributes), L denotes the length of the vector space, and the notation 0:M:L denotes every $M^{th}$ index starting at the $0^{th}$ index. In this example, a second subspace can correspond to indices 1:M:L, a third subspace can correspond to indices 2:M:L, etc. In an example, the vector space 210 has 256 dimensions, and each of the musical attributes of genre, instrument, mood, and tempo correspond to a respective 64 of the 256 dimensions.

The neural network module 204 provides the anchor feature vector to the loss module 208 and the mask module 206. The neural network module 204 also provides the track feature vectors to the loss module 208, and the tag feature vectors to the mask module 206.

The mask module 206 can be implemented to apply a masking function to feature vectors, the masking function corresponding to one or more of the disjoint subspaces of the vector space 210. By masking the feature vectors with the mask module 206, the system 200 can train the neural network of the neural network module 204 to impose features for a specific musical attribute to a corresponding subspace of the vector space 210.

The mask module 206 can apply a masking function for a subspace to a feature vector so that the result returns the elements of the feature vector corresponding to the subspace, and does not return the elements of the feature vector that do not correspond to the subspace. For example, let a masking function be denoted by $m_s$ for a subspace s, and a feature vector be denoted by $G(x)$. The mask module 206 applies the masking function $m_s$ to the feature vector $G(x)$, denoted as $G(x) \odot m_s$. The masking function can be a real-valued vector of length equal to the length of the feature vector, and the operator $\odot$ denotes element-by-element multiplication. In one example, the masking function $m_s$ includes ones at the indices of the vector space 210 corresponding to the subspace s, and zeros in other positions. Hence, the element-by-element multiplication of the feature vector $G(x)$ with the masking function $m_s$ can pass through the values of the feature vector $G(x)$ at the positions of the subspace s, without passing through values of the feature vector $G(x)$ at positions for subspaces other than the subspace s, e.g., these values can be zeroed by the masking function. The mask module 206 can combine masking functions for multiple subspaces so that application of the masking function returns the values of the feature vector for the multiple subspaces, without returning values of the feature vector for subspaces other than the multiple subspaces.

Additionally or alternatively, the mask module 206 may use a masking function that includes values other than ones or zeros, so that the masking function weights positions of the vector space 210 relative to one another. For example, the masking function may include the values of [1 3 5 7 9 7 5 3 1] for a subspace spanning nine positions of the vector space 210, so that the values at the center of the subspace are weighted more heavily than values at the edges of the subspace.

In one example, the mask module 206 adaptively learns the masking functions for the musical attributes. For instance, values of the masking functions can be adjusted over time during the training of the neural network, such as by minimizing a loss function of the loss module 208 over ranges of the values of the masking functions. Additionally or alternatively, the dimensions of the vector space 210 that correspond to the music attributes may not be fixed, but adjusted over time during the training of the neural network. For instance, dimensions 0 . . . N−1 of the vector space 210 for an integer N can correspond to a first musical attribute and dimensions N . . . 2N−1 of the vector space 210 can correspond to a second musical attribute at the initialization of the adaptation process. As the neural network is trained, e.g., for every block of 100 triplets provided by the triplet module 202, the dimensions can be adjusted for each of the musical attributes so as to minimize a loss function of the loss module 208 over dimensions of the vector space 210. Additionally or alternatively, the number of dimensions of the vector space 210 that correspond to the music attributes may not be fixed, but adjusted over time during the training of the neural network. For instance, K dimensions of the vector space 210 can correspond to a first musical attribute and P dimensions of the vector space 210 can correspond to a second musical attribute at the initialization of the adaptation process, for integers K and P. As the neural network is trained, e.g., for every block of 100 triplets provided by the triplet module 202, the numbers of the dimensions can be adjusted for each of the musical attributes so as to minimize a loss function of the loss module 208.

The mask module 206 can obtain a tag used to generate the tag triplet from the triplet construction data provided from the triplet module 202, and generate a masking function corresponding to a subspace of the vector space 210 that represents a musical attribute for the tag. The mask module 206 can then apply the masking function to the anchor feature vector and the tag feature vectors to generate masked feature vectors. For instance, the masked feature vectors can include masked versions of the anchor feature vector, the feature vector of the negative tag file, and the feature vector of the positive track file, or $G(x_{anchor}) \odot m_s$, $G(x_{neg}^{tag}) \odot m_s$, and $G(x_{pos}^{tag}) \odot m_s$, respectively. The mask module 206 can provide the masked feature vectors to the loss module 208.

The loss module 208 can be implemented to generate training updates from a loss function of the feature vectors, and provide the training updates to the neural network module 204 to update the neural network (e.g., adjust at least one convolutional coefficient of the neural network). The loss module 208 can receive the anchor feature vector and the track feature vectors from the neural network module 204, and the masked feature vectors from the mask module 206. The loss module 208 can evaluate a loss function that includes a track loss term and a tag loss term, the track loss term determined from the anchor feature vector and the track feature vectors, and the tag loss term determined from the masked feature vectors.

For feature vectors of the track-based triplets, the loss module 208 can determine a track loss term based on distances of the track feature vectors to the anchor feature vector over the vector space 210 (e.g., over all the disjoint subspaces corresponding to the musical attributes). The loss module 208 can determine the distances between two feature vectors $G(x_i)$ and $G(x_j)$ corresponding to the music files $x_i$ and $x_j$, respectively, according to $$D(x_i,x_j)=\|G(x_i)-G(x_j)\|.$$

The notation $\|\cdot\|$ denotes any suitable norm, such as an $L_2$ norm (e.g., the square root of the sum of the squares of elements), the square of an $L_2$ norm (e.g., the sum of the squares of elements), an $L_1$ norm (e.g., the sum of the absolute values of elements), and the like. Hence, the loss module 208 can determine the distance between two music files as the distance between feature vectors of the music files calculated according to a norm of the difference of the feature vectors, such as the Euclidean distance between the feature vectors in the vector space 210.

Based on the distances between the anchor feature vector and the track feature vectors in the vector space 210, the loss module 208 can determine a track loss term according to $$\mathcal{L}_{track}=D(x_{anchor},x_{pos}^{track})-D(x_{anchor},x_{neg}^{track})+\Delta.$$

The term $\Delta$ is a tuning parameter representing a margin value for the difference between $D(x_{anchor},x_{pos}^{track})$ and $(x_{anchor},x_{neg}^{track})$, and controls the track loss term so that it does not collapse. The margin value $\Delta$ can be set in any suitable way. For example, the margin value $\Delta$ can be set to 0.1.

In one example, the loss module 208 constrains the track loss term to be non-negative. For instance, the loss module 208 can determine the track loss term from $\max(0, \mathcal{L}_{track})$. Additionally or alternatively, the loss module 208 can determine the track loss term by summing $\mathcal{L}_{track}$ determined as above over a plurality of track-based triplets, so that the loss module 208 can update the neural network of the neural network module 204 in a batch fashion (e.g., based on a batch of triplet files generated by the triplet module 202).

Because the loss module 208 determines the distances between feature vectors for the track-based triplets over the entire vector space 210 (e.g., the plurality of disjoint subspaces corresponding to the musical attributes), the loss module 208 can train the neural network to impose a global similarity across the vector space 210. To also train the neural network to impose similarity for a specific musical attribute in the corresponding subspace of the vector space 210, the loss module 208 combines the track loss term $\mathcal{L}_{track}$ with a tag loss term determined from the masked feature vectors.

For instance, since the masked feature vectors provided to the loss module 208 from the mask module 206 have been generated by applying a masking function $m_s$ for a subspace s of the vector space 210 to the anchor feature vector and the tag feature vectors, the loss module 208 determines distances between music files $x_i$ and $x_j$ of the tag-based triplet as the distances between the corresponding masked feature vectors for the tag-based triplet for the subspace s, or $$D(x_i,x_j;s)=\|G(x_i)\odot m_s-G(x_j)\odot m_s\|.$$

The loss module 208 determines a tag loss term from differences of the distances between the masked feature vectors according to $$\mathcal{L}_{tag}=D(x_{anchor},x_{pos}^{tag};s)-(x_{anchor},x_{neg}^{tag};s)+\Delta.$$

As discussed above with regards to the track loss term, the norm $\|\cdot\|$ denotes any suitable norm, and the margin value $\Delta$ can be set in any suitable way, such as to 0.1. The loss module 208 can constrain the tag loss term to be non-negative. For instance, the loss module 208 can determine the tag loss term from $\max(0, \mathcal{L}_{tag})$. Additionally or alternatively, the loss module 208 can determine the tag loss term by summing $\mathcal{L}_{tag}$ determined over a plurality of tag-based triplets, so that the loss module 208 can update the neural network of the neural network module 204 in a batch fashion.

To impose both a global similarity across an entirety of the vector space 210 as well as similarity for a specific musical attribute in the corresponding subspace of the vector space 210, the loss module 208 can combine the track loss term $\mathcal{L}_{track}$ with the tag loss term $\mathcal{L}_{tag}$ to form a loss function $$\mathcal{L}=\alpha\cdot\mathcal{L}_{track}+\beta\cdot\mathcal{L}_{tag}.$$

The combining weights $\alpha$ and $\beta$ can be set in any suitable way. In one example, $\alpha=\frac{1}{2}$ and $\beta=1$.

The loss module 208 can train a neural network of the neural network module 204 based on the loss function $\mathcal{L}$ in any suitable way. In one example, the loss module 208 updates the neural network according to a stochastic gradient descent optimizer update on the loss function $\mathcal{L}$. For example, the loss module 208 can determine a gradient of the loss function $\mathcal{L}$, and generate an update term from the gradient. The loss module 208 can provide the update term as part of training updates to the neural network module 204. The loss module 208 can include any suitable data as part of the training updates to the neural network module 204, such as regressor data, stepsizes, differences or previous and current coefficients, and the like. Based on the training updates provided from the loss module 208, the neural network module 204 can update the neural network, such as by adjusting at least one convolutional coefficient of the neural network according to the training updates.

Because both the track loss term and the tag loss term of the loss function $\mathcal{L}$ are generated based on a difference of a distance between an anchor file and a positive file and a distance between an anchor file and a negative file, the loss module 208 can train the neural network to map the music files to the vector space 210 where positive files are "closer" to anchor files than negative files. Moreover, because the vector space 210 is multi-dimensional and disentangled (e.g., having a plurality of disjoint subspaces corresponding to respective musical attributes), the system 200 can train a single neural network that can be used for searching for music files over one or more of the musical attributes, without requiring a separate neural network for each of the musical attributes. Hence, a music search system using the neural network trained by the system 200 can require fewer processing and storage resources than conventional music search systems.

Example Music Search System

Figure 3:
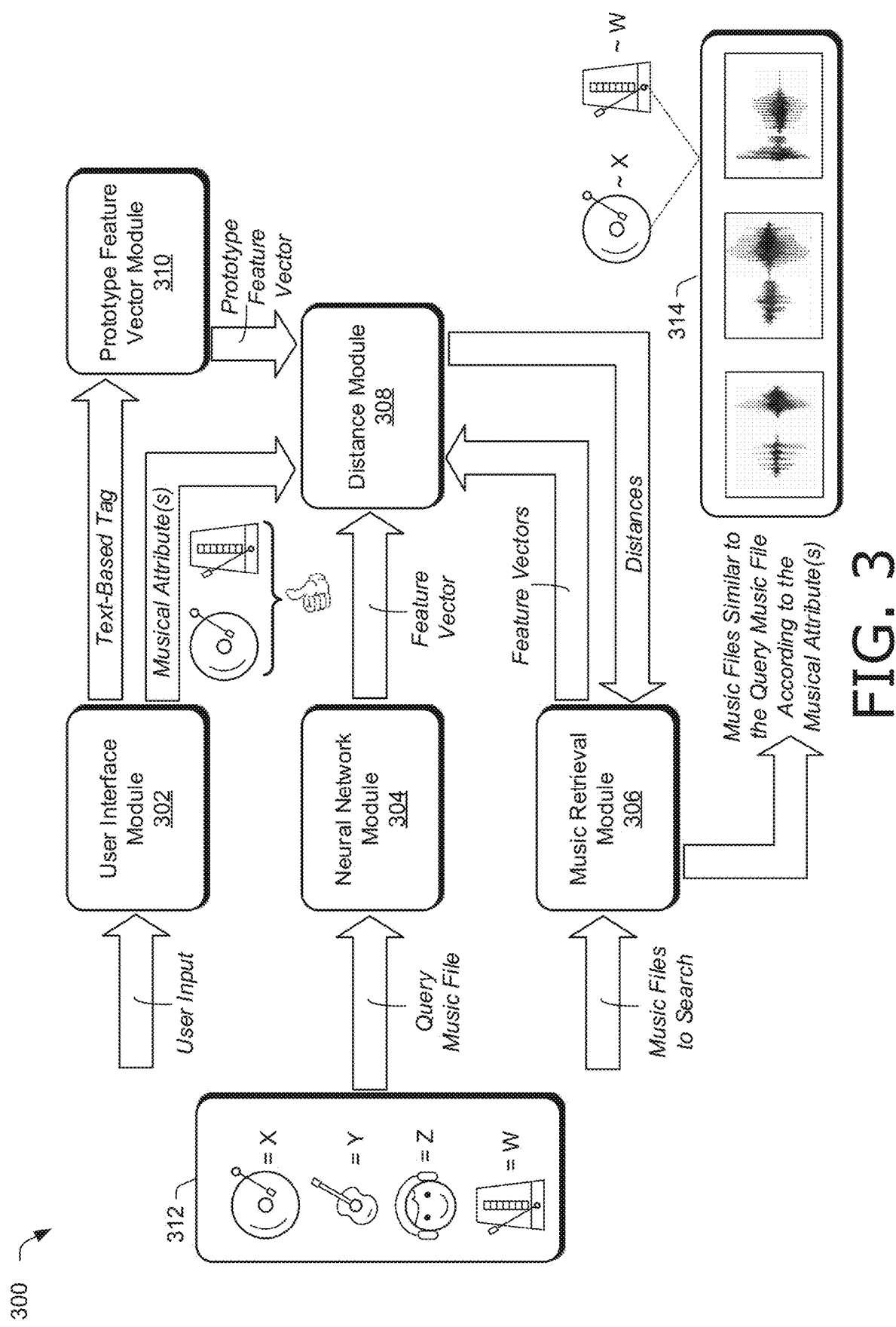
FIG. 3 illustrates an example system usable for searching for music in accordance with one or more aspects of the disclosure.

FIG. 3 illustrates an example system 300 usable for searching for music in accordance with one or more aspects of the disclosure. In this implementation, the system 300 includes user interface module 302, neural network module 304, music retrieval module 306, distance module 308, and prototype feature vector module 310. These modules can be implemented as any type of module or component in software (e.g., as software instructions that are executable with a processing system), hardware, or combinations thereof, as a standalone application or as a module or component of another device application, and in any type of computing device. The system 300 is one example of the music search system 104 that can be constructed using these modules. For instance, signals can be redefined, and modules can be modified, combined, divided, added, or removed to form a modified system, without altering the functionality of the system 300. Accordingly, such modified systems are considered to be within the scope of the disclosure. Furthermore, for simplicity, the system 300 is limited to these modules and a description of some of their interconnects. The system 300 can, however, include any suitable signals and communications between modules omitted for simplicity. Such signals can include system clocks, counters, file indicators, sequence indicators, reset signals, and the like. In one example, the system 300 can operate in real time (e.g., with no perceptible delay to a user). Accordingly, signals can be calculated by the modules of the system 300 and communicated between the modules of the system 300 without significant delay, so that a user can search for music files with the system 300 without perceptible delay to the user.

Moreover, the system 300 can be implemented on any suitable device or devices. In one example, the system 300 is implemented on one computing device (e.g., the computing device 102 in FIG. 1). In another example, the system 300 is implemented on more than one computing device. For instance, parts of the system 300 can be implemented by a first computing device, such as one computing device of the computing device 102 in FIG. 1, and other parts of the system 300 can be implemented by an additional computing device of the computing device 102. In one example, a server implements parts of the system 300, such as the server 142 in FIG. 1. A server can be remote, e.g., because it is not collocated with the first computing device. A server may be implemented to receive signals of the system 300 from a computing device (e.g., the computing device 102), process the received signals, such as with the music search support system 146, and transmit results of the processing back to the computing device. Hence, the music search support system 146 of the server 142 in FIG. 1 can include the system 300.

Additionally or alternatively, parts of the system 300 can be implemented by an additional computing device that is collocated with a first computing device. For instance, one device of the computing device 102 can be a first computing device, and another device of the computing device 102 can be an additional, collocated computing device. The first computing device and the additional computing device can be operated by one or more users. Hence, the system 300 can provide for multiple users within an environment to share data included in the system 300.

The user interface module 302 can be implemented to generate and display a user interface. The user interface 106 in FIG. 1 is an example of a user interface generated by the user interface module 302. The user interface module 302 can display, in the user interface, options and controls for searching for music and results of the search, and receive user inputs via the user interface. The user interface module 302 can receive any suitable user inputs via the user interface, including a designation of an audio file as a query music file, a user selection of musical attributes for which the user would like to find music files that are perceptually similar to the query music file, a user selection of musical attributes for which the user would like to find music files that are perceptually dissimilar to the query music file, a user selection to initiate a global search (e.g., to search over all musical attributes represented in a vector space), and the like.

In the example illustrated in FIG. 3, a user provides a query music file 312 to the system 300, and the user interface module 302 can display a representation of the query music file 312 in a user interface, such as an image depicting time characteristics of the music content of the query music file 312, frequency characteristics of the music content of the query music file 312, combinations thereof, and the like. As indicated in FIG. 3, the query music file 312 has musical attributes including a genre attribute of type "X" (e.g., type "X" may designate the genre of the query music file 312 as "classic rock"), an instrument attribute of type "Y" (e.g., type "Y" may designate that the query music file 312 includes a piano and vocals), a mood attribute of type "Z" (e.g., type "Z" may designate the mood of the query music file 312 as "happy"), and a tempo attribute of type "Z" (e.g., type "Z" may designate the average perceptual tempo of the query music file 312 as between 100 and 110 beats per minute).

The user may provide user input to the user interface module 302 that includes a selection of one or more of the musical attributes of genre, instruments, mood, and tempo. The user may also provide user input including a selection to search for music files that have music content that is perceptually similar or dissimilar to the music content of the query music file 312 according to the selected musical attributes. In the example illustrated in FIG. 3, the user has selected musical attributes of genre and tempo, and selected to search for music files based on similarity, rather than dissimilarity, as indicated by the turntable and metronome icons with "thumbs-up" icon at the output of the user interface module 302. The user interface module 302 provides the user-selected musical attributes to the distance module 308.

A user interface of the user interface module 302 can display any suitable mechanism for a user to select a degree of similarity or a degree of dissimilarity of a musical attribute or music file. In one example, the user interface includes a switch that is selectable between a setting corresponding to complete similarity (e.g., 100% similarity is desired), and a setting corresponding to complete dissimilarity (e.g., 100% dissimilarity is desired). Additionally or alternatively, the user interface can display a continuous adjuster (e.g., a slider) for each musical attribute. The adjusters can range from a "completely similar" selection to a "completely dissimilar" selection. A center selection of the continuous adjuster can correspond to a "don't care" selection in which the musical attribute is not important to the user. Hence, the system 300 can allow a user continuous control over the relative importance of each musical attribute displayed in a user interface when searching for music, such as between 0 and 100% similarity and between 0 and 100% dissimilarity.

The neural network module 304 can be implemented to generate a feature vector in a disentangled vector space for the query music file 312. The neural network module 304 can generate a feature vector with a neural network. In one example, the neural network module 304 includes a neural network as illustrated in FIG. 4 (discussed below in more detail) that has been trained by the system 200 illustrated in FIG. 2. For instance, the neural network module 304 can include a pre-trained neural network G(•) of the neural network module 204 of FIG. 2.

The neural network module 304 can generate a feature vector for the query music file 312 from any suitable portion of the query music file 312, such as a three second duration of the query music file 312. For example, the neural network module 304 can randomly determine a portion of the query music file 312 and generate a feature vector from the randomly determined portion. In one example, the neural network module 304 determines a portion of the query music file 312 using an automatic music segmentation system that splits a song into segments. The portion of the query music file 312 can be determined as one of the segments of the song produced automatically from the music segmentation system. Additionally or alternatively, the neural network module 304 can determine a portion of the query music file 312 based on the characteristics of the music content of the query music file 312, such as spectral characteristics, temporal characteristic, amplitude characteristics, dynamic range, etc., and then generate a feature vector from the determined portion of the query music file 312. For instance, the neural network module 304 can determine a portion of the query music file 312 as having a wider bandwidth or larger dynamic range than other portions of the query music file 312, a bandwidth above a threshold bandwidth, a dynamic range above a threshold dynamic range, or combinations thereof, and then generate a feature vector from the determined portion of the query music file 312.

In one example, the neural network module 304 generates a feature vector for the query music file 312 by averaging multiple feature vectors of the query music file 312. For example, the neural network module 304 can generate multiple feature vectors of the query music file 312 for different and non-overlapping sections of the query music file 312, such as different versions of a chorus or bridge throughout the query music file 312, randomly-sampled sections of the query music file 312, or contiguous sections of the query music file 312. The neural network module 304 can then form an average of the multiple feature vectors to form the feature vector for the query music file 312. By averaging feature vectors that correspond to different sections of the query music file 312 with related content of the query music file 312, such as repeated vocalizations of the chorus or playings of a bridge, the system 300 can return search results that can better match the query music file 312 compared to using a feature vector generated from a single section of the query music file 312, such as a single three second duration of the query music file 312. The neural network module 304 can provide the feature vector corresponding to the query music file 312 to the distance module 308.

Although the query music file 312 is denoted as a single user-provided music file in FIG. 3 for clarity, in an example the query music file 312 can include multiple query music files provided by a user as part of a search request. In this case, the neural network module 304 can generate respective feature vectors for the multiple query music files, and determine a single feature vector for the query music file 312 from an average of the respective feature vectors for the multiple query music files. The neural network module 304 can average the feature vectors for the multiple query music files in any suitable way, such as by computing a weighted average of the feature vectors in which each feature vector is assigned a respective weight. Additionally or alternatively, the neural network module 304 can assign a respective weight to each subspace for the feature vectors, and compute a weighted average of the feature vectors over the vector space, weighted averages over each of the disjoint subspaces of the vector space, or combinations thereof, to average the feature vectors for the multiple query music files into a single feature vector. The neural network module 304 can then use this single feature vector resulting from the averaging as the feature vector corresponding to the query music file 312 provided to the distance module 308.

Additionally or alternatively, when a user desires to search for music files that are similar to a first query music file and dissimilar to a second query music file, the system 300 can orthogonalize the feature vector of the first query music file from the feature vector of the second query music file. For example, the neural network module 304 can generate a first feature vector of the first query music file and a second feature vector of the second query music file, and a projection of the second feature vector onto the first feature vector. The neural network module 304 can generate the projection from the scalar projection of the second feature vector onto a unit vector in the direction of the first feature vector. For instance, for first feature vector a and second feature vector b, the neural network module 304 can determine the projection of b onto a as $$\left(b \cdot \frac{a}{|a|}\right)\hat{a},$$

where â denotes a unit vector in the direction of a, (•) denotes inner product, and |•| denotes length. The neural network module 304 can then subtract the projection from the first feature vector to form a feature vector provided to the distance module 308, e.g., an orthogonalized feature vector.

In one example, a user can select a degree of dissimilarity for the second query music file. For instance, the user may adjust a continuous slider in a user interface of the user interface module 302 to indicate a desired degree of dissimilarity (e.g., between 0 and 100%). A setting of 0% can indicate a "don't care" condition, e.g., the user does not want to search for music files that are dissimilar to the second query music file. A setting of 100% can indicate the user desires to search for music files that are completely dissimilar to the second query music file, and a setting of 50% can indicate the user desires to search for music files that are partially, but not completely, dissimilar to the second query music file. The neural network module 304 can then subtract an amount of the projection from the first feature vector to form the feature vector provided to the distance module 308, the amount of the projection based on the degree of dissimilarity. For example, if the user selects a 75% degree of dissimilarity, the neural network module 304 can scale the projection by 0.75, and subtract the scaled projection from the first feature vector to form the feature vector provided to the distance module 308.

In one example, the neural network module 304 receives a prototype feature vector from the prototype feature vector module 310, such as a prototype feature vector corresponding to a text-based tag supplied by a user. For instance, a user may provide a text-based tag together with multiple query music files as part of a music search query. The neural network module 304 can average the prototype feature vector together with the feature vectors of the multiple query music files into a single feature vector that is provided to the distance module 308.

The music retrieval module 306 can be implemented to obtain music files and feature vectors of the music files, such as from a database of music files and feature vectors of the music files. For example, the assets 144 of the server 142 in FIG. 1 can include a database of music files and feature vectors, which are obtained by the music retrieval module 306. Additionally or alternatively, the music retrieval module 306 can obtain the feature vectors of the music files by providing the music files to the neural network module 304, which can then generate feature vectors for the music files with a neural network and provide the generated feature vectors to the music retrieval module 306. The music files obtained by the music retrieval module 306 are examples of music files that the system 300 can search over to find music that is perceptually similar to the query music file 312. The music retrieval module 306 can provide the feature vectors for the music files to search over to the distance module 308.

The distance module 308 can be implemented to determine distances between feature vectors, such as distances between the feature vector for the query music file 312 and feature vectors for the music files to search over. Hence, the distance module 308 can receive the feature vector for the query music file 312 from the neural network module 304, the feature vectors from the music retrieval module 306, and the musical attributes corresponding to the user selections from the user interface module 302.

The distance module 308 can determine the distances over any suitable subspaces of the vector space (e.g., the vector space 210). In one example, the distance module 308 determines the distances over the disjoint subspaces of the vector space. For instance, a user may select a "global search" button of a user interface of the user interface module 302, instructing the system 300 to search for music files that have music content deemed to be perceptually similar to the music content of the query music file 312 according to all of the musical attributes represented in the vector space.

Additionally or alternatively, the distance module 308 can compute the distances separately over each of the subspaces of the vector space, such as by computing first distances from the feature vector of the query music file 312 to the feature vectors provided by the music retrieval module 306 over the subspace corresponding to genre, second distances from the feature vector of the query music file 312 to the feature vectors provided by the music retrieval module 306 over the subspace corresponding to instrument, third distances from the feature vector of the query music file 312 to the feature vectors provided by the music retrieval module 306 over the subspace corresponding to mood, and fourth distances from the feature vector of the query music file 312 to the feature vectors provided by the music retrieval module 306 over the subspace corresponding to tempo. The distance module 308 can provide the first, second, third, and fourth distances as distances to the music retrieval module 306. Hence, the music retrieval module 306 can determine similarity or dissimilarity separately according to each musical attribute.

In the example in FIG. 3, since the user has selected genre and tempo musical attributes, the distance module 308 can determine distances from the feature vector of the query music file 312 to the feature vectors provided by the music retrieval module 306 over the subspaces corresponding to genre and tempo musical attributes. For example, let $s_g$ and $s_t$ denote the subspaces of the vector space corresponding to genre and tempo, respectively, and $m_{s_g}$ and $m_{s_t}$ be masking functions for the respective subspaces corresponding to genre and tempo, as described above. Moreover, let $G(x)$ denote the feature vector of a query music file x, e.g., the query music file 312, and let $G(y_i)$ denote the $i^{th}$ feature vector of the feature vectors corresponding to music files to search over, e.g., the feature vectors provided by the music retrieval module 306. The distance module 308 can determine distances for the genre musical attribute by computing the distances over the subspaces corresponding to the genre musical attribute and not over the subspaces that correspond to other musical attributes, such as instruments, mood, and tempo. For instance, the distance module 308 can determine the distances for the genre musical attribute according to $$\|G(x)\odot m_{s_g}-G(y_i)\odot m_{s_g}\|.$$

The distance module 308 can determine distances for the tempo musical attribute by computing the distances over the subspaces corresponding to the tempo musical attribute and not over the subspaces that correspond to other musical attributes, such as genre, instruments, and mood. For instance, the distance module 308 can determine the distances for the tempo musical attribute according to $$\|G(x)\odot m_{s_t}-G(y_i)\odot m_{s_t}\|.$$

As discussed above, the norm cannot denote any suitable norm, such as an $L_2$ norm.

In the example illustrated in FIG. 3, the user has indicated to search for music files that are perceptually similar to the query music file 312 (denoted by the "thumbs up" icon). Hence, the distance module 308 can determine the distances jointly over the subspaces corresponding to genre and tempo musical attributes. For example, the distance module 308 can generate a composite masking function to span the subspaces of the vector space corresponding to the genre and tempo attributes, denoted as $m_{s_{gt}} = m_{s_g} \oplus m_{s_t}$, where the operator $\oplus$ denotes an addition of $m_{s_g}$ and $m_{s_t}$ so that if $m_{s_g}$ returns the values of a feature vector in the subspace $\varphi$ and $m_{s_t}$ returns the values of a feature vector in the subspace $\phi$, then $m_{s_{gt}}$ returns the values of a feature vector in the subspace $\varphi \cup \phi$, where U denotes union. Hence, the distance module 308 can determine the distances for the genre and tempo musical attributes according to $$\|G(x) \odot m_{s_{gt}} - G(y_i) \odot m_{s_{gt}}\|.$$

In one example, the distance module 308 can use a masking function that operates on only a portion of a subspace of the vector space, rather than the whole subspace. For example, as described above with regards to FIG. 2, the mask module 206 may weight positions of a subspace relative to other positions of the subspace. For instance, the masking function used by the mask module 206 may include the values of [1 3 5 7 9 7 5 3 1] for a subspace spanning nine positions of the vector space, so that the values at the center of the subspace are weighted more heavily than values at the edges of the subspace. Accordingly, the system 300 can implement a reduced-complexity search by configuring the distance module 308 to generate distance values over only a portion of the subspace instead of the entire subspace. For the example of the masking function having the values of [1 3 5 7 9 7 5 3 1], the distance module 308 can restrict the distance calculations to the more-heavily weighted positions, such as the five center-most positions of the subspace corresponding to the masking weights 5, 7, 9, 7, 5, and neglect the positions at the edges of the subspace, e.g., corresponding to the masking weights of 1, 3, 3, and 1. Hence, the system 300 can be implemented to search for music files using a reduced number of resources, and may be suitable for devices with limited processing resources, such as a mobile device.

The distance module 308 can provide the distances, along with any suitable information to describe the distances, such as masking functions used to generate the distances, indicators of music files corresponding to the distances, etc., to the music retrieval module 306.

The music retrieval module 306 can receive the distances from the distance module 308, and provide one or more of the music files as search results based on the distances received from the distance module 308. The music retrieval module 306 can determine the music files to return as search results based on the distances in any suitable way, such as by comparing the distances to a threshold, ranking the distances, similarity of feature vectors, etc. For example, the music retrieval module 306 can determine the music files that are closest to the query music file 312 based on the distances with the smallest values, and return these music files as search results. The music retrieval module 306 can search for music files based on the distances in any suitable way, such as based on nearest-neighbor search technique, e.g., a tree search or locality-sensitive hashing. In one example, the music retrieval module 306 returns the music files in a ranked order according to the distances from the distance module 308. For instance, music files corresponding to larger distances relative to the query music file 312 can be at one end of a ranked, ordered list, and music files corresponding to smaller distances relative to the query music file 312 can be at the other end of the ranked, ordered list. The music retrieval module 306 can return music files based on the ranked, ordered list, such as by returning a top number (e.g., top ten) of the music files in the ranked, ordered list, the top number corresponding to the music files with the smallest distances.

Additionally or alternatively, the music retrieval module 306 can return the music files based on a distance threshold. For example, when similarity is selected, the music retrieval module 306 can return music files corresponding to respective distances that are less than a distance similarity threshold. For example, for distances that are normalized between zero and one, the music retrieval module 306 can return the music files with feature vectors within a distance of 0.2 to the feature vector of the query music file 312. When dissimilarity is selected, the music retrieval module 306 can return music files corresponding to respective distances that are greater than a distance dissimilarity threshold. For example, for distances that are normalized between zero and one, the music retrieval module 306 can return the music files corresponding to distances of greater than 0.7.

In one example, the music retrieval module 306 determines the music files to return as search results based on similarity of the feature vectors. For instance, the music retrieval module 306 can form clusters of the feature vectors based on the similarity of feature vectors, such as by assigning the feature vectors to a position or grid number on a grid display based on contents of the feature vectors. The music retrieval module 306 can assign feature vectors to a grid display in any suitable way, such as using two or more elements of the feature vectors to determine a position for a feature vector on the grid display, a norm of a feature vector, a density of a feature vector (e.g., a kurtosis value), distances between feature vectors over two disjoint subspaces of the vector space, combinations thereof, and the like. In one example, the music retrieval module 306 determines a first measure over a first subspace for a feature vector (e.g., an average of the contents of the feature vector for the first subspace) and a second measure over a second subspace for the feature vector (e.g., an L1 norm of the contents of the feature vector for the second subspace), and assigns the feature vector to the grid display based on the first and second measures determined for the feature vector. Hence, the music retrieval module 306 can form clusters of the feature vectors on a grid display, and each of the clusters can include feature vectors that are similar based on any suitable measure of similarity. The music retrieval module 306 can form the clusters based on the grid locations, such as by grouping grid locations within a distance threshold of each other (e.g., within five grid locations), and assigning the feature vectors at the grouped grid locations into a cluster. The music retrieval module 306 can then return the music files corresponding to one of the clusters of feature vectors as search results.

In the example illustrated in FIG. 3, the music retrieval module 306 returns music files 314 that are deemed to have music content that is perceptually similar to the music content of the query music file 312 according to the musical attributes of genre and tempo. This is illustrated by denoting the genre of the music files 314 as approximately of the type "X" and the tempo of the music files 314 as approximately of the type "W". The music files 314 can correspond to the smallest distances over subspaces corresponding to genre and tempo attributes provided from the distance module 308, and therefore the music retrieval module 306 can return these music files as search results.

In one example, a user provides user input to the user interface module 302 that designates a tag, such as a text-based tag that can indicate a type of a musical attribute. For instance, the user may input the text "gypsy jazz" to denote a genre of type jazz and a sub-genre of type gypsy, which can represent music of the specific genre made famous by Django Reinhardt. The system 300 can search for music files based on the text-based tag, even in the absence of the query music file 312. For example, the user interface module 302 can provide the user-specified tag to the prototype feature vector module 310.

The prototype feature vector module 310 can be implemented to determine a prototype feature vector from among a plurality of prototype feature vectors. In one example, the prototype feature vector module 310 retrieves pre-determined prototype feature vectors that are stored, such as in the assets 144 of the server 142 in FIG. 1. The prototype feature vector module 310 can generate a prototype feature vector for each text-based tag or musical attribute from feature vectors stored in a database, such as the feature vectors obtained by the music retrieval module 306. The prototype feature vector module 310 can determine the feature vectors corresponding to the text-based tag or the musical attribute, and average these feature vectors to form a prototype feature vector for the text-based tag or the musical attribute. Hence, the prototype feature vector is a representative feature vector for the text-based tag or the musical attribute, such as a prototype feature vector representing a country-and-western genre, a prototype feature vector representing piano solos, a prototype feature vector representing mellow moods, and the like. The prototype feature vectors can be computed and stored for later use, such as when a user provides a text-based tag as a search query in lieu of a query music file.

In the absence of the query music file 312, the system 300 can use the prototype feature vector corresponding to the user-specified tag or musical attribute as the feature vector of the query music file 312. Accordingly, the prototype feature vector module 310 can provide a prototype feature vector to the distance module 308, which can determine the distances from the prototype feature vector to the feature vectors provided from the music retrieval module 306. Based on these distances, the music retrieval module can return music files that have musical content deemed to match the musical attribute indicated by the user-specified tag. The user can then select one of the music files returned by the music retrieval module 306 and designate it as a new query music file, and conduct a new search using the system 300 for music files based on the new query music file. In this way, the user can continue to refine a search in an iterative way, by designating a music file returned from a current iteration of the search as a new query music file for a next iteration of the search.

Example Neural Network

FIG. 4 illustrates an example neural network 400 in accordance with one or more aspects of the disclosure. The neural network 400 is an example of a neural network of a music search system that can generate feature vectors in a disentangled vector space. For instance, the neural network 400 is an example of a neural network of the music search system 104, the neural network module 204 of the system 200, and the neural network module 304 of the system 300. The neural network 400 includes a preprocessing module 402, a convolution and max pool block 404, and six instantiations of an inception block, inception blocks 406-416.

The preprocessing module 402 can be implemented to receive a music file (e.g., a query music file or audio file of a set of triplets of audio files used to train the neural network 400), and generate a two-dimensional representation of the music file suitable for generating a feature vector. The preprocessing module 402 can generate any suitable two-dimensional representation of the music file, such as a spectrogram. In one example, the preprocessing module 402 generates a log-scaled Mel-spectrogram from the music file. A Mel scale results from a non-linear transformation of a frequency scale, so that sounds of equal distance from each other in the Mel scale are perceived by humans as equal in distance from one another, unlike a linear frequency scale. The preprocessing module 402 can generate a Mel-spectrogram from a music file by separating the music file into windows of data, computing a Fourier transform of each window, and decomposing the magnitude of the frequency response data from the Fourier transform into components corresponding to frequencies in the Mel scale.

In one example, the preprocessing module 402 generates a Mel-spectrogram P from a music file having a 3-second duration using a window size of 23 msec with 50% overlap and 128 Mel bands. The preprocessing module 402 can generate a log-scaled Mel-spectrogram S from the Mel-spectrogram P according to $S=\log_{10}(1+10*P)$, resulting in a log-scaled Mel-spectrogram having dimensions of 129×128. The preprocessing module 402 can provide the log-scaled Mel-spectrogram to the convolution and max pool block 404.

The convolution and max pool block 404 can be implemented to perform two-dimensional convolutional filtering and max pooling of the log-scaled Mel-spectrogram provided from the preprocessing module 402. In one example, the convolution and max pool block 404 implements 64 convolutional filters with a 5×5 kernel, followed by 2×2 strided max pooling. Hence, the preprocessing module 402 can reduce the data size from 129×128 to 64×64. The output of the preprocessing module 402 is passed to a series of six inception blocks 406-416.

The inception blocks 406-416 conduct convolutions on multiple scales and reduce the size of the data by a factor of two with each block, so that the 64×64 data from the preprocessing module 402 is reduced to 32×32 by the inception block 406, and continuing through the six inception blocks, to 1×1 at the output of the inception block 416. The neural network 400 can implement 256 channels of the data processing to generate the feature vector 418 having dimensions 256×1. The feature vector 418 is an example of a feature vector belonging to a disentangled vector space, such as the vector space 210 in FIG. 2. In one example, the feature vector 418 belongs to a vector space having four subspaces corresponding to the respective musical attributes of genre, instrument, mood, and tempo. Each of the subspaces can make up 64 dimensions of the vector space.

The inception block 420 is an example of the inception blocks 406-416, and performs convolutions on multiple scales using different size convolutions. For example, an input received from a previous block is processed by multiple convolution blocks in parallel, including a 1×1 convolution, a 3×3 convolution, and a 5×5 convolution, as well as a 3×3 max pool. The results of these blocks are concatenated and again processed by multiple convolution blocks in parallel, including a 1×1 convolution, a series of a 1×1 convolution and a 3×3 convolution, a series of a 1×1 convolution and a 5×5 convolution, and a series of a 3×3 max pool and a 1×1 convolution. The results of these blocks are concatenated to form the output of the inception block 420.

The systems described herein constitute improvements over conventional music search systems that are limited to a global similarity search along a single dimension, and instead can search for music files that are similar to a query music file according to one or more musical attributes specified by a user. By searching for music files based on a disentangled vector space having disjoint subspaces corresponding to respective musical attributes, the systems described herein can return music files based on perceptual similarity or dissimilarity according to any suitable combination of the musical attributes. Moreover, the systems described herein can train a single neural network to determine multi-dimensional music similarity in the disentangled vector space, rather than relying on multiple neural networks each dedicated to a single dimension of music similarity. Accordingly, the systems described herein can be efficiently implemented. Furthermore, the systems described herein can search for music files based on a level of specificity that is not so low as to return multiple versions of a query music file, such as a live version, cover song version, or alternative mix of a song that are likely subject to undesirable copyright, and not so high as to return music files that lack perceptual similarity to the query music file. Accordingly, the systems described herein are suitable to a music replacement task in which music is desired that is perceptually similar to a query music file, but not the same music as the query music file, unlike conventional music search systems.

Example Procedures

Figure 5:
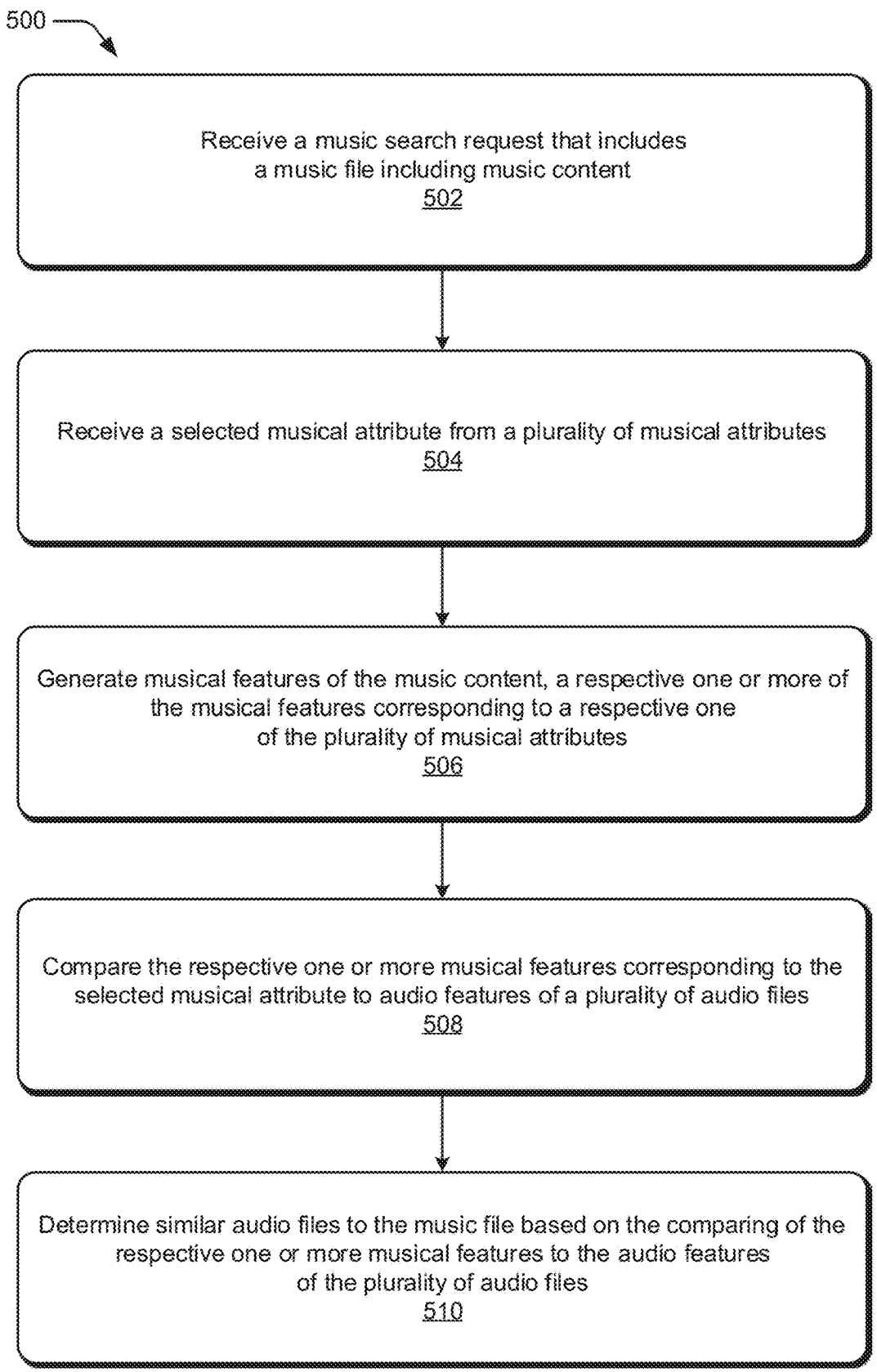
FIG. 5 illustrates a flow diagram depicting an example procedure in accordance with one or more aspects of the disclosure.

FIG. 5 illustrates an example procedure 500 for searching for music in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of the computing device 102 or the server 142 of FIG. 1 that makes use of a music search system, such as the system 200, the system 300, or the music search system 104. A music search system implementing procedure 500 may be an independent application that has been installed on the computing device, a service hosted by a service provider that is accessible by the computing device, a plug-in module to the computing device, or combinations thereof.

A music search request that includes a music file including music content is received (block 502). For example, the music file can be supplied by a user to a user interface of the user interface module 302 as part of a music search request. The user may upload the music file to the music search application 156, so that the music search system can search for music files (e.g., audio files) having music content deemed to be similar or dissimilar to the music content of the music file received as the query input.

A selected musical attribute is received from a plurality of musical attributes (block 504). For example, a user interface of the user interface module 302 can receive a user selection of a musical attribute from a plurality of musical attributes. The user may also set a similarity switch in the user interface to a similarity position, instead of a dissimilarity position, to indicate to search for music files having music content that is similar to the music content of the music file according to the selected musical attribute.

Musical features of the music content are generated (block 506). A respective one or more of the musical features can correspond to a respective one of the plurality of musical attributes. In one example, generating the musical features of the music content includes generating a feature vector that includes a representation of each of the musical features, the feature vector partitioned into independent subspaces that each represent a respective musical attribute of the plurality of musical attributes. For example, the musical features can be generated as a feature vector from the music file, the feature vector belonging to a vector space that is partitioned into a plurality of disjoint subspaces, each disjoint subspace including multiple dimensions of the vector space and representing a respective musical attribute for the music content of the music file. In one example, the neural network module 304 generates the musical features as a feature vector belonging to a vector space having a plurality of disjoint subspaces corresponding to respective musical attributes. The vector space 210 in FIG. 2 is an example of the vector space that is partitioned into a plurality of disjoint subspaces, each disjoint subspace including multiple dimensions of the vector space and representing a respective musical attribute. The musical attributes can include two or more of a genre attribute, a mood attribute, an instrument attribute, and a tempo attribute.

In one example, the music search system generates a representation of frequencies of the music content in the music file, and generates, with a neural network, a feature vector that includes the musical features of the music content based on the representation of frequencies. The neural network can have coefficients determined from triplets of the audio files, each triplet including an anchor file having anchor content, a positive file having positive content that is similar to the anchor content according to at least one of the plurality of musical attributes, and a negative file having negative content that is dissimilar to the anchor content according to the at least one of the plurality of musical attributes.

In an example, generating the musical features of the music content includes generating a plurality of additional features from respective portions of the music file, and averaging the plurality of additional features to generate the musical features. For instance, a plurality of additional feature vectors can be generated from respective portions of the music file, and the plurality of additional feature vectors can be averaged to generate a feature vector containing the musical features.

The respective one or more musical features corresponding to the selected musical attribute are compared to audio features of a plurality of audio files (block 508). Comparing of the respective one or more musical features to the audio features can include determining distances of the feature vector to feature vectors representing the audio features over one of the independent subspaces that corresponds to the selected musical attribute.

Similar audio files to the music file are determined based on the comparing of the respective one or more musical features to the audio features of the plurality of audio files (block 510). In one example, the distances of the feature vector to feature vectors representing the audio features are compared to a distance similarity threshold, and determining the similar audio files to the music file is based on one or more of the distances that are less than the distance similarity threshold. For example, the distance module 308 can normalize the distances to be between zero and one, and the music retrieval module 306 can set the distance similarity threshold to 0.2, so that audio files are returned as search results if their corresponding feature vectors are within a distance of 0.2 to the feature vector of the music file.

In an example, the plurality of audio files can be ranked based on the distances, and determining the similar audio files to the music file can be based on the ranking Additionally or alternatively, when none of the distances are less than the distance similarity threshold, the similar audio files can be determined from the ranking. For example, the audio files corresponding to the ten distances with lowest values can be provided as the similar audio files. In this case, since none of the audio files satisfy the distance criterion in this case, the music search system can generate a warning message that indicates the similar audio files do not satisfy the distance similarity threshold. For instance, a user interface of the user interface module 302 can display a warning message with the text "Caution, these search results may do not satisfy your search request". Audio content of the similar audio files can be provided for playback.

In an example, a user can conduct a search based on multiple audio files used as query music files. For instance, an additional music file including additional music content can be received as part of the music search request. The music search system can generate additional musical features of the additional music content, a respective one or more of the additional musical features also corresponding to a respective one of the plurality of musical attributes. The music search system can then combine the musical features of the music content with the additional musical features of the additional music content into averaged musical features, and compare the averaged musical features corresponding to the selected musical attribute to the audio features of the plurality of audio files. The music search system can determine the similar audio files to the music file based on the comparing of the averaged musical features to the audio features.

In one example, the user can conduct a search based on multiple audio files used as query music files, and configure the search to be based at least in part on a dissimilarity of one of the audio files used as a search query. For example, an additional music file including additional music content can be received by the music search system as part of the music search request, such as by a user uploading the additional music file to the music search application 156. A user interface of the user interface module 302 can receive an additional user selection of an additional musical attribute for the additional music content of the additional music file, the additional user selection indicating the additional musical attribute as undesired. The neural network module 304 can generate an additional feature vector from the additional music file, and the distance module 308 can then determine additional distances of the additional feature vector to the feature vectors over an additional subspace of the plurality of disjoint subspaces corresponding to the additional musical attribute. The music retrieval module 306 can then provide one or more audio files as the search results based on the additional distances being greater than a distance dissimilarity threshold. In this case, the audio content of the one or more audio files is dissimilar to the additional music content of the additional music file according to the additional musical attribute.

Additionally or alternatively, an additional music file including additional music content can be received by the music search system as another query input as part of the music search request, such as by a user uploading the additional music file to the music search application 156. A user interface of the user interface module 302 can receive an additional user selection of an additional musical attribute for the additional music content of the additional music file, the additional user selection indicating a degree of desired dissimilarity for the additional musical attribute. For example, the degree of desired dissimilarity can correspond to a desired percentage of dissimilarity, such as 75% dissimilarity, selected by a user on a continuous adjuster in a user interface of the user interface module 302. The neural network module 304 can generate an additional feature vector from the additional music file, the additional feature vector belonging to the vector space, and determine a projection of the additional feature vector onto the feature vector. The neural network module 304 can then determine an orthogonalized feature vector by subtracting an amount of the projection from the feature vector, the amount based on the degree of desired dissimilarity. For example, the neural network module 304 can scale the projection in proportion to the percentage of dissimilarity corresponding to the degree of desired dissimilarity, such as by multiplying the projection by 0.75 for a 75% desired percentage of dissimilarity. The distance module 308 can then determine additional distances of the orthogonalized feature vector to the feature vectors of the plurality of audio files. The music retrieval module 306 can then provide one or more audio files as the results of the music search request based on the additional distances, and the audio content of the one or more audio files deemed dissimilar to the additional music content of the additional music file according to the additional musical attribute and the degree of desired dissimilarity.

FIG. 6 illustrates an example procedure 600 for searching for music in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of the computing device 102 or the server 142 of FIG. 1 that makes use of a music search system, such as the system 200, the system 300, or the music search system 104. A music search system implementing procedure 600 may be an independent application that has been installed on the computing device, a service hosted by a service provider that is accessible by the computing device, a plug-in module to the computing device, or combinations thereof.

Prototype feature vectors having elements that represent a respective one of a plurality of musical attributes are maintained (block 602). Each of the prototype feature vectors corresponds to respective text-based tags that indicate one or more of the musical attributes, and each of the prototype feature vectors are formed by averaging feature vectors that represent music files tagged with a respective one of the text-based tags. For example, the feature vectors for music files tagged with a text-based tag indicating a genre of "modern jazz" can be averaged to form a prototype feature vector that represents modern jazz songs.

A selected text-based tag is received as part of a music search request, the selected text-based tag indicating a musical attribute of the plurality of musical attributes (block 604). For example, a user interface of the user interface module 302 can receive a user selection of a text-based tag that indicates a musical attribute as part of a music search request. As an example, a text-based tag may indicate a desired genre of music, such as "new age acoustic", to indicate to the music search system to search for "new age acoustic" music. In one example, the selected text-based tag is received as part of the music search request without receiving a music file as part of the music search request.

A matching prototype feature vector from the prototype feature vectors is determined based on the selected text-based tag (block 606). For example, the prototype feature vector module 310 can determine a matching prototype feature vector from the prototype feature vectors based on the selected text-based tag.

The elements of the matching prototype feature vector that correspond to the musical attribute indicated by the selected text-based tag are compared to additional feature vectors of a plurality of audio files (block 608). For example, the distance module 308 can compare the elements of the matching prototype feature vector that correspond to the musical attribute indicated by the selected text-based tag to additional feature vectors of a plurality of audio files. The distance module 308 can compare the elements of the matching prototype feature vector to the additional feature vectors by determining norms of differences between the matching prototype feature vector and the additional feature vectors using the elements of the matching prototype feature vector corresponding to the musical attribute indicated by the selected text-based tag. In one example, the distance module 308 compares the elements of the matching prototype feature vector to the additional feature vectors by determining norms of differences between the matching prototype feature vector and the additional feature vectors using all of the elements of the matching prototype feature vector.

Based on the compare, information of one or more of the plurality of audio files to display on the computing device is determined (block 610). For example, the music retrieval module 306 can determine, based on the compare, information of one or more of the plurality of audio files to display on the computing device.

In one example, the music search system receives a music file as part of the music search request, and receives a degree of desired dissimilarity for an additional musical attribute of the plurality of musical attributes. The music search system can generate an additional feature vector from the music file, and determine a projection of the additional feature vector onto the matching prototype feature vector. The music search system can determine an orthogonalized feature vector by subtracting an amount of the projection from the matching prototype feature vector, the amount based on the degree of desired dissimilarity, and compare the orthogonalized feature vector to the additional feature vectors of the plurality of audio files. The music search system can then determine, based on the compare the orthogonalized feature vector to the additional feature vectors, information of at least one of the plurality of audio files to display on the computing device.

Additionally or alternatively, the music search system can receive a music file as part of the music search request, and generate an additional feature vector from the music file. The music search system can combine the matching prototype feature vector and the additional feature vector to form an averaged feature vector, and compare the averaged feature vector to the additional feature vectors of the plurality of audio files. The music search system can then determine, based on the compare the averaged feature vector to the additional feature vectors, information of at least one of the plurality of audio files to display on the computing device.

Figure 7:
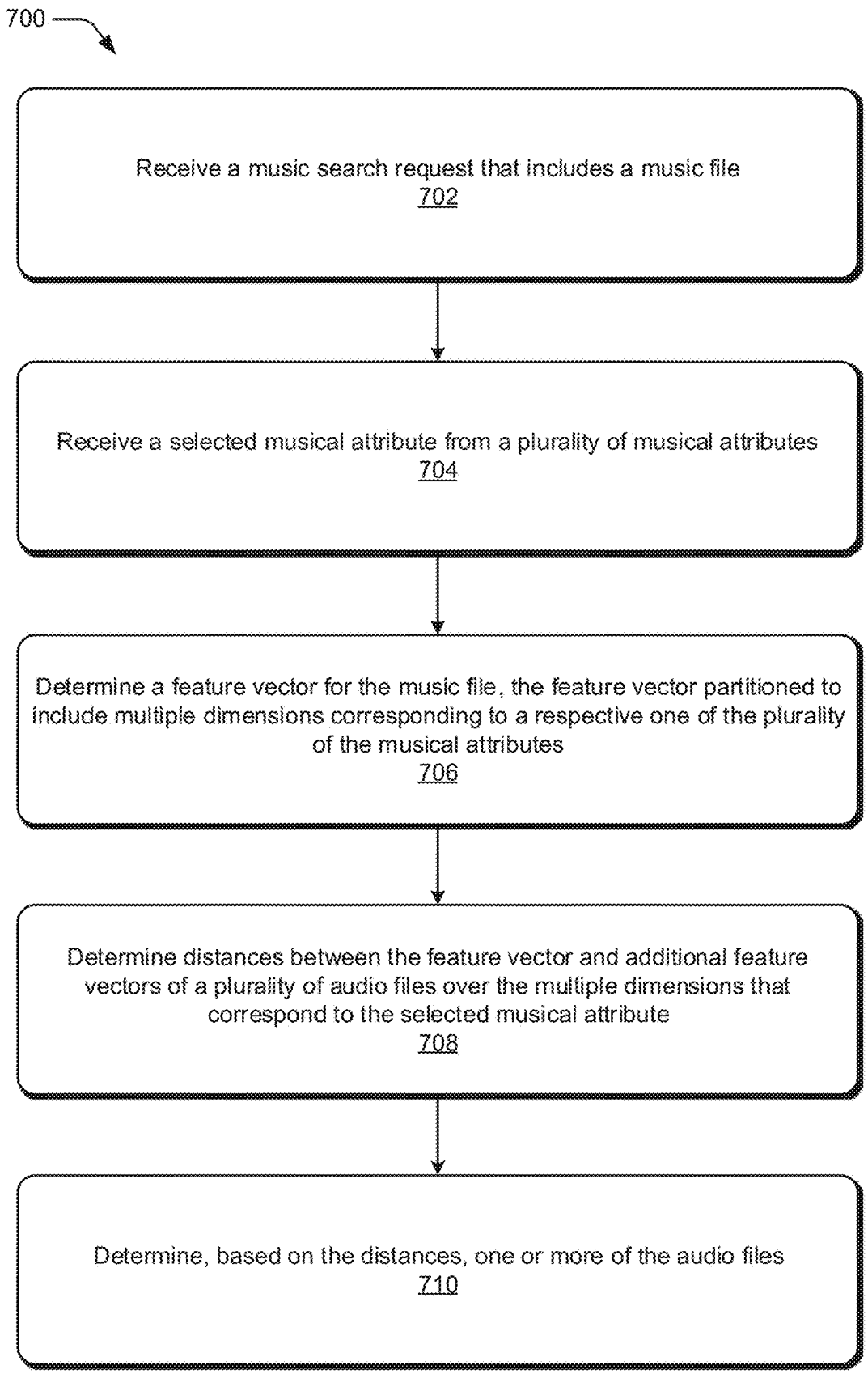
FIG. 7 illustrates a flow diagram depicting an example procedure in accordance with one or more aspects of the disclosure.

FIG. 7 illustrates an example procedure 700 for searching for music in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of the computing device 102 or the server 142 of FIG. 1 that makes use of a music search system, such as the system 200, the system 300, or the music search system 104. A music search system implementing procedure 700 may be an independent application that has been installed on the computing device, a service hosted by a service provider that is accessible by the computing device, a plug-in module to the computing device, or combinations thereof.

A music search request that includes a music file is received (block 702). For example, the user interface module 302 can receive a music search request that includes a music file. A selected musical attribute from a plurality of musical attributes is received (block 704). For example, the user interface module 302 can display a plurality of musical attributes and receive a user selection of a musical attribute from the plurality of musical attributes.

A feature vector for the music file is determined (block 706). The feature vector can be partitioned to include multiple dimensions corresponding to a respective one of the plurality of the musical attributes. For example, the neural network module 304 can determine the feature vector as belonging to a vector space partitioned into a plurality of disjoint subspaces each corresponding to a respective one of the plurality of the musical attributes, such as the vector space 210. In one example, determining the feature vector for the music file includes determining a plurality of music feature vectors based on respective portions of the music file, and combining two or more of the music feature vectors to determine the feature vector for the music file.

Distances between the feature vector and additional feature vectors of a plurality of audio files are determined over the multiple dimensions that correspond to the selected musical attribute (block 708). The distance module 308 can determine the distances between the feature vector and additional feature vectors of a plurality of audio files over the multiple dimensions that correspond to the selected musical attribute.

Based on the distances, one or more of the audio files are determined (block 710). For example, the music retrieval module 306 can determine, based on the distances, one or more of the audio files. In one example, the user interface module 302 receives a degree of desired similarity, and the music retrieval module 306 ranks the distances and determines the one or more of the audio files based on the degree of desired similarity and the ranking.

Additionally or alternatively, the user interface module 302 of the music search system can receive an additional selected musical attribute from the plurality of musical attributes. The distance module 308 can then determine the distances by determining a first distance over the multiple dimensions corresponding to the selected musical attribute and a second distance over the multiple dimensions corresponding to the additional selected musical attribute.

Figure 9:
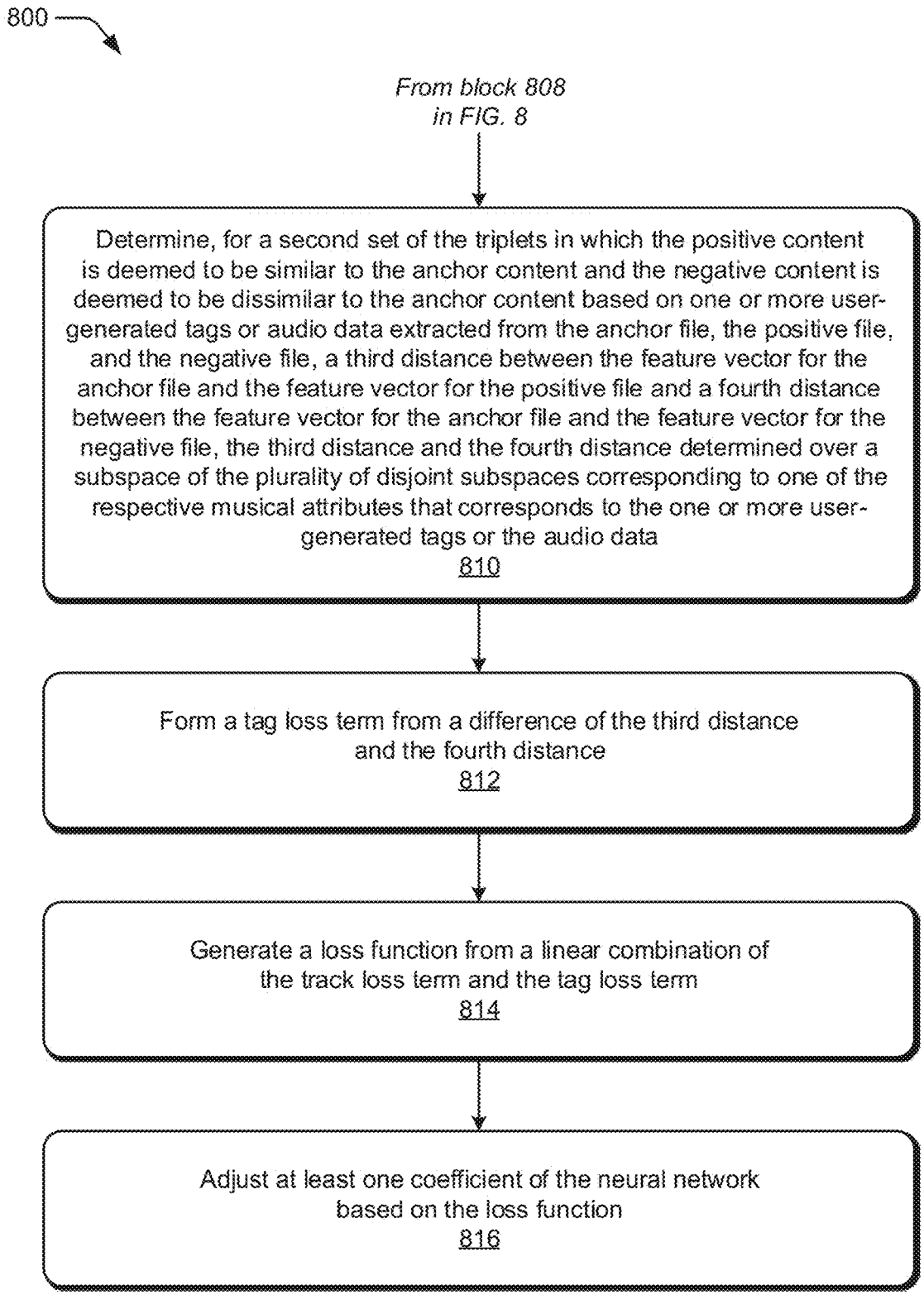

FIGS. 8 and 9 illustrates an example procedure 800 for training a neural network for searching for music in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of the computing device 102 or the server 142 of FIG. 1 that makes use of a music search system, such as the system 200, the system 300, or the music search system 104. A music search system implementing procedure 800 may be an independent application that has been installed on the computing device, a service hosted by a service provider that is accessible by the computing device, a plug-in module to the computing device, or combinations thereof.

Sets of triplets of audio files are obtained (block 802). For example, the triplet module 202 can obtain the sets of triplets, such as by generating the sets of triplets or retrieving the sets of triplets from storage (e.g., a database maintained by a server). Each triplet can include an anchor file having anchor content, a positive file having positive content deemed to be similar to the anchor content, and a negative file having negative content deemed to be dissimilar to the anchor content.

A respective feature vector for each audio file is generated with a neural network, the respective feature vector belonging to a vector space having a plurality of disjoint subspaces corresponding to respective musical attributes (block 804). For example, the feature vectors can belong to a vector space that is partitioned into a plurality of disjoint subspaces, each disjoint subspace including multiple dimensions of the vector space and representing a respective musical attribute. The neural network module 204 can generate a respective feature vector for each audio file of the sets of triplets.

For a first set of the triplets in which the anchor content and the positive content correspond to non-overlapping portions of a same audio file, and the negative content does not correspond to the same audio file, a first distance between the feature vector for the anchor file and the feature vector for the positive file and a second distance between the feature vector for the anchor file and the feature vector for the negative file are determined (block 806). The first distance and the second distance can be determined over the plurality of disjoint subspaces of the vector space using contents of the feature vectors for the plurality of disjoint subspaces. The loss module 208 can determine the first distance and the second distance for the first set of the triplets.

A track loss term is formed from a difference of the first distance and the second distance (block 808). The loss module 208 can form a track loss term from a difference of the first distance and the second distance.

For a second set of the triplets in which the positive content is deemed to be similar to the anchor content and the negative content is deemed to be dissimilar to the anchor content based on one or more user-generated tags or audio features extracted from the anchor file, the positive file, and the negative file, a third distance between the feature vector for the anchor file and the feature vector for the positive file and a fourth distance between the feature vector for the anchor file and the feature vector for the negative file are determined (block 810). The third distance and the fourth distance can be determined over a subspace of the plurality of disjoint subspaces corresponding to one of the respective musical attributes that corresponds to the one or more user-generated tags or the audio features, such as by using contents of the feature vectors for the anchor file, the positive file, and the negative file for the subspace of the plurality of disjoint subspaces corresponding to the one of the respective musical attributes. The loss module 208 can determine the third distance and the fourth distance for the second set of the triplets. In one example, the first set of triplets and the second set of triplets share a same anchor file.

A tag loss term is formed from a difference of the third distance and the fourth distance (block 812). The loss module 208 can form a tag loss term from a difference of the third distance and the fourth distance. The loss module 208 can then generate a loss function from a linear combination of the track loss term and the tag loss term (block 814). In one example, the track loss term is weighted by a factor of one half relative to the weighting of the tag loss term in the linear combination.

At least one coefficient of the neural network is adjusted based on the loss function (block 816). For example, the loss module 208 can provide training updates to the neural network based on the loss function, such as based on a gradient of the loss function, and the neural network module 204 can adjust least one coefficient of the neural network is adjusted based on the training updates. Accordingly, the neural network can be trained based on the triplets to map the audio files to the vector space where positive files are "closer" to anchor files than negative files and impose both a global similarity across an entirety of the vector space as well as similarity for a specific musical attribute in the corresponding subspace of the vector space.

The procedures described herein constitute improvements over conventional music search procedures that are limited to a global similarity search along a single dimension, and instead can search for music files that are similar to a query music file according to one or more musical attributes specified by a user. By searching for music files based on a disentangled vector space having disjoint subspaces corresponding to respective musical attributes, the procedures described herein can return music files based on perceptual similarity or dissimilarity according to any suitable combination of the musical attributes. Moreover, the procedures described herein can train a single neural network to determine multi-dimensional music similarity in the disentangled vector space, rather than relying on multiple neural networks each dedicated to a single dimension of music similarity. Accordingly, the procedures described herein can be efficiently implemented. Furthermore, the procedures described herein can search for music files based on a level of specificity that is not so low as to return multiple versions of a query music file, such as a live version, cover song version, or alternative mix of a song that are likely subject to undesirable copyright, and not so high as to return music files that lack perceptual similarity to the query music file. Accordingly, the procedures described herein are suitable to a music replacement task in which music is desired that is perceptually similar to a query music file, but not the same music as the query music file, unlike conventional music search procedures.

Example Systems and Devices

Figure 10:
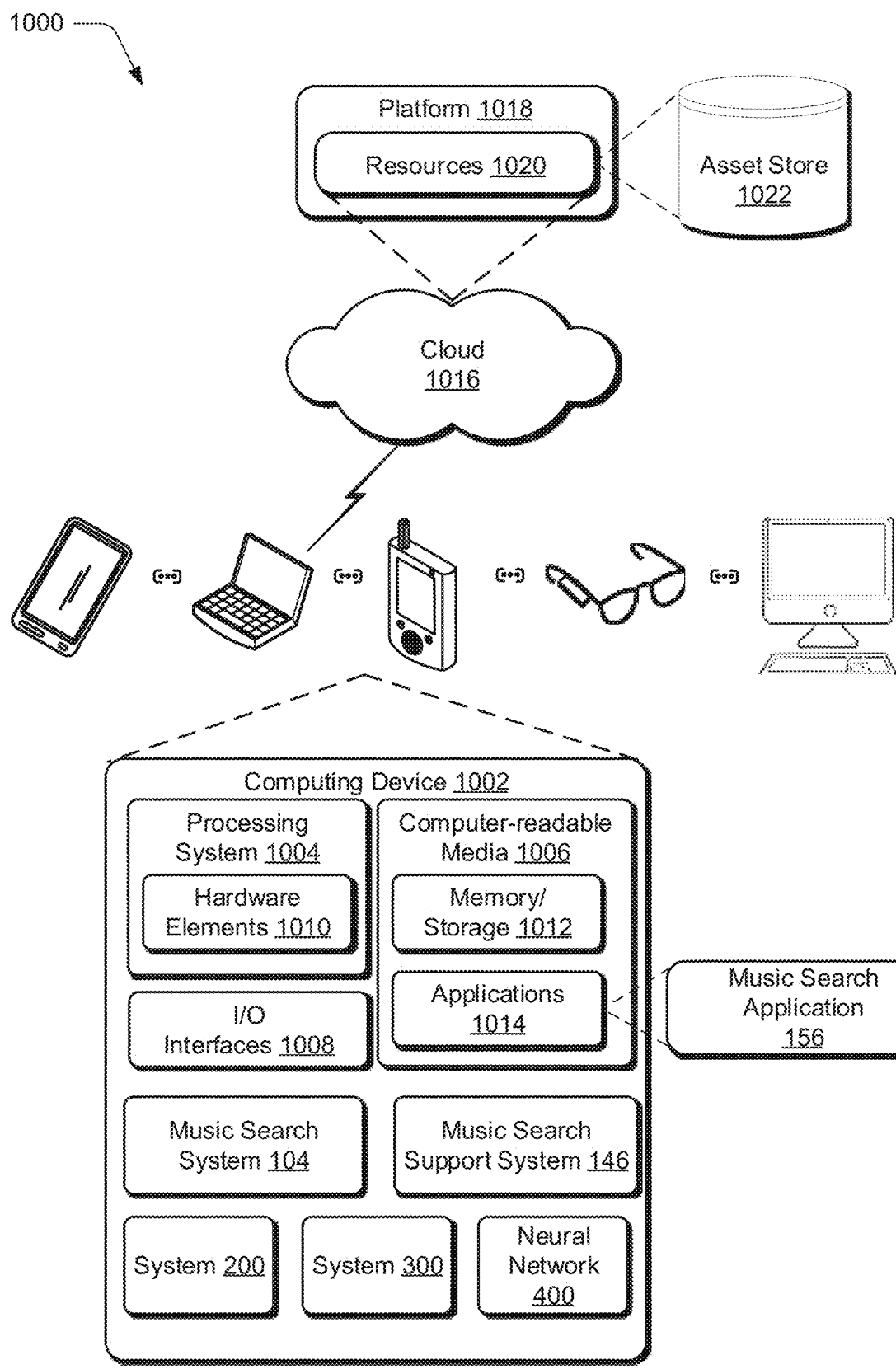
FIG. 10 illustrates an example system including various components of an example device that can be implemented as any type of computing device as described and/or utilized with reference to FIGS. 1-9 to implement aspects of the techniques described herein.

FIG. 10 illustrates an example system 1000 including an example computing device 1002 that is representative of one or more computing systems and devices that can be utilized to implement the various techniques described herein. This is illustrated through inclusion of the music search system 104, the system 200, the system 300, the neural network 400, the music search application 156, and the music search support system 146, which operate as described above. The computing device 1002 can be, for example, a user computing device (e.g., the computing device 102 in FIG. 1), or a server device of a service provider, (e.g., the server 142 in FIG. 1). Furthermore, the computing device 1002 can include an on-chip system, multiple computing devices, combinations thereof, or any other suitable computing device or computing system. Accordingly, FIG. 10 illustrates the computing device 1002 as one or more of a tablet, a laptop computer, a smart phone, smart eye glasses, and a desktop computer, though these examples are illustrative and in no way are meant to limit the type or number of devices that can be represented by the computing device 1002.

The example computing device 1002 includes a processing system 1004, one or more computer-readable media 1006, and one or more I/O interfaces 1008 that are communicatively coupled to each other. Although not shown, the computing device 1002 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that can be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. The processors 150 in FIG. 1 are an example of the processing system 1004.

The computer-readable storage media 1006 is illustrated as including memory/storage 1012. The storage 152 in FIG. 1 is an example of memory/storage of the memory/storage 1012. The memory/storage 1012 can include volatile media (such as random access memory (RAM)), nonvolatile media (such as read only memory (ROM), flash memory, optical disks, magnetic disks, and so forth), or combinations thereof. The memory/storage 1012 can include fixed media (e.g., RAM, ROM, a fixed hard drive, and so on) as well as removable media (e.g., flash memory, a removable hard drive, an optical disc, and so forth). The computer-readable media 1006 can be configured in a variety of other ways as further described below.

The input/output interfaces 1008 are representative of functionality to allow a user to enter commands and information to the computing device 1002, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, the input/output interfaces 1008 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, the computing device 1002 can be configured in a variety of ways as further described below to support user interaction.

The computing device 1002 also includes applications 1014. The applications 1014 are representative of any suitable applications capable of running on the computing device 1002, and can include a web browser which is operable to access various kinds of web-based resources (e.g., music files, feature vectors, images, videos, assets, media clips, images, content, configuration files, services, user profiles, and the like). The applications 1014 include the music search application 156, which operates as previously described. Furthermore, the applications 1014 can include any applications supporting the music search system 104, the system 200, the system 300, the neural network 400, or the music search support system 146.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and the computer-readable media 1006 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more of the hardware elements 1010, or combinations thereof. The computing device 1002 may be configured to implement particular instructions and functions corresponding to the software and hardware modules. Accordingly, implementation of a module that is executable by the computing device 1002 as software may be achieved at least partially in hardware, e.g., through use of computer-readable storage media and the hardware elements 1010 of the processing system 1004. The instructions and functions may be executable/operable by one or more articles of manufacture (for example, one or more computing devices such as computing device 1002 or processing systems such as the processing system 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1016 via a platform 1018. The cloud 1016 includes and is representative of the platform 1018 for the resources 1020. The platform 1018 abstracts underlying functionality of hardware (e.g., servers) and software resources of the cloud 1016. The resources 1020 may include applications, data, or applications and data that can be utilized while computer processing is executed on servers that are remote from the computing device 1002. The resources 1020 can also include services provided over the Internet, through a subscriber network, such as a cellular or Wi-Fi network, or combinations thereof. The resources 1020 can include an asset store 1022, which stores assets, such as music files, audio files, feature vectors of the music files and audio files, videos, photographs (e.g., user images in a gallery, a database of stock photographs, and the like), design files, documents, user profile data, user image libraries, photographs posted in a shared photo service, animation sequences, digital images, metadata of assets, and the like, and may be accessed by the computing device 1002.

Generally, the resources 1020 may be licensed, purchased, or may be made freely available, (e.g., without authentication, license, or account-based access). The resources 1020 can include any suitable combination of services and content, such as a music search service, a video-editing service, an on-line shopping service, an image editing service, an artwork drawing service, a web development and management service, a collaboration service, a social networking service, a messaging service, an advertisement service, a graphics design service, an animation service, an image storage service (including storage of photos, digital images, documents, records, files, and the like), a graphics editing service, an asset distribution service, and so forth. Content may include various combinations of assets as described above, including document designs and review documents.

The platform 1018 may abstract resources and functions to connect the computing device 1002 with other computing devices. The platform 1018 may also serve to abstract scaling of resources to provide a corresponding level of scale to encountered demand for the resources 1020 that are implemented via the platform 1018. Accordingly, in an interconnected device embodiment, implementation of functionality described herein may be distributed throughout the system 1000. For example, the functionality may be implemented in part on the computing device 1002 as well as via the platform 1018 that abstracts the functionality of the cloud 1016.

Conclusion

In one or more implementations, a digital medium environment includes at least one computing device. Systems, devices, and techniques are described herein for searching for music. A music search system is implemented to search for music that is perceptually similar to music content of a query music file. A user can specify one or more musical attributes, such as genre, mood, instrument, and tempo, and the music search system can provide one or more music files as search results that are deemed to have audio content similar to the music content of the query music file according to the one or more musical attributes specified by the user. To determine similarity of music files, the music search system can determine distances between feature vectors of the music files, the feature vectors belonging to a vector space that is partitioned into a plurality of disjoint subspaces, each disjoint subspace including multiple dimensions of the vector space and representing a respective musical attribute. The music search system can determine the distances using contents of the feature vectors for the disjoint subspaces corresponding to the user-specified musical attributes.

The music search system can train a neural network used to generate the feature vectors in the vector space using triplets of audio files that include an anchor file having anchor content, a positive file having positive content deemed to be similar to the anchor content, and a negative file having negative content deemed to be dissimilar to the anchor content. The triplets can be based on audio track data or tag data, and the music search system can train the neural network based on a loss function made up of a track loss term determined from track-based triplets and a tag loss term determined from tag-based triplets. Hence, the music search system can train the neural network to impose both a global similarity across the vector space and a similarity for a specific musical attribute in the corresponding subspace of the vector space.

Accordingly, the music search system can search for music files that are perceptually similar to a query music file according to one or more musical attributes, rather than being limited to a global similarity search along a single dimension of music similarity, like conventional music search systems. Moreover, because the music search system can train a single neural network to determine multi-dimensional music similarity over a disentangled vector space having a plurality of disjoint subspaces corresponding to the musical attributes, the music search system is efficient and suitable to the music replacement task in which music is desired that is perceptually similar to a query piece of music, but not the same music as the query piece of music.

Although implementations of searching for music have been described in language specific to features and/or methods, the appended claims are not necessarily limited to the specific features or methods described. Rather, the specific features and methods are disclosed as example implementations of searching for music, and other equivalent features and methods are intended to be within the scope of the appended claims. Further, various different examples are described and it is to be appreciated that each described example can be implemented independently or in connection with one or more other described examples.

What is claimed is:

1. A method implemented by a computing device, the method comprising:
   receiving a music search request that includes a music file including music content, the music content having musical features determined by a neural network;
   receiving a musical attribute that corresponds to one or more of the musical features;
   comparing the one or more musical features corresponding to the musical attribute to audio features of audio files; and
   determining a similar audio file to the music file based at least in part on the comparing of the one or more musical features to the audio features of the audio files.

2. The method of claim 1, wherein the musical attribute includes two or more of a genre attribute, a mood attribute, an instrument attribute, or a tempo attribute.

3. The method of claim 1, further comprising providing audio content of the similar audio file for playback by the computing device.

4. The method of claim 1, wherein the neural network determines the musical features of the music content by generating a feature vector that includes a representation of each of the musical features, the feature vector partitioned into independent subspaces that each represent one of multiple musical attributes.

5. The method of claim 4, wherein the comparing of the one or more musical features to the audio features includes determining distances of the feature vector to feature vectors representing the audio features over one of the independent subspaces that corresponds to the musical attribute.

6. The method of claim 5, further comprising:
   comparing the distances to a distance similarity threshold; and
   the determining the similar audio file to the music file based on one or more of the distances that are less than the distance similarity threshold.

7. The method of claim 5, further comprising:
   ranking the audio files based on the distances; and
   determining the similar audio file to the music file based on the ranking.

8. The method of claim 1, further comprising:
   receiving an additional music file including additional music content as part of the music search request;
   combining the musical features of the music content with additional musical features of the additional music content into averaged musical features;
   comparing the averaged musical features corresponding to the musical attribute to the audio features of the audio files; and
   determining the similar audio file to the music file based at least in part on the comparing of the averaged musical features to the audio features.

9. The method of claim 1, further comprising:
   generating a representation of frequencies of the music content in the music file; and
   generating, by the neural network, a feature vector that includes the musical features of the music content based on the representation of the frequencies, the neural network having coefficients determined from triplets of the audio files, each triplet including an anchor file having anchor content, a positive file having positive content that is similar to the anchor content according to the musical attribute, and a negative file having negative content that is dissimilar to the anchor content according to the musical attribute.

10. A method implemented by a computing device, the method comprising:
    receiving a music search request that includes a music file including music content having musical features;
    receiving a selected musical attribute that corresponds to one or more of the musical features;
    determining a feature vector for the music file, the feature vector partitioned to include multiple dimensions each corresponding to a respective one of multiple musical attributes;
    determining distances between the feature vector and additional feature vectors of audio files over the multiple dimensions that correspond to the selected musical attribute; and
    determining, based on the distances, one or more of the audio files that are similar to the music file.

11. The method of claim 10, further comprising:
    receiving a degree of desired similarity;
    ranking the distances; and
    determining the one or more of the audio files based on the degree of the desired similarity and the ranking.

12. The method of claim 10, further comprising:
    receiving an additional selected musical attribute from the multiple musical attributes; and
    wherein the determining the distances includes determining a first distance over the multiple dimensions corresponding to the selected musical attribute and a second distance over the multiple dimensions corresponding to the additional selected musical attribute.

13. The method of claim 10, wherein the determining the feature vector for the music file includes:
    determining music feature vectors based on respective portions of the music file; and
    combining two or more of the music feature vectors to determine the feature vector for the music file.

14. A music search system, comprising:
    a memory to maintain elements that represent musical attributes; and
    a processor system to implement a music search application at least partially in hardware of a computing device to:
    receive a music search request that includes a music file including music content, the music content having musical features determined by a neural network;
    receive a musical attribute that corresponds to one or more of the musical features;
    compare the one or more musical features corresponding to the musical attribute to audio features of audio files; and determine a similar audio file to the music file based at least in part on the one or more musical features compared to the audio features of the audio files.

15. The music search system of claim 14, wherein the musical attribute includes two or more of a genre attribute, a mood attribute, an instrument attribute, or a tempo attribute.

16. The music search system of claim 14, wherein the music search application is implemented to provide audio content of the similar audio file for playback by the computing device.

17. The music search system of claim 14, wherein, to determine the musical features of the music content, the neural network is implemented to generate a feature vector that includes a representation of each of the musical features, the feature vector partitioned into independent subspaces that each represent one of multiple musical attributes.

18. The music search system of claim 17, wherein, to compare the one or more musical features to the audio features, the music search application is implemented to determine distances of the feature vector to feature vectors representing the audio features over one of the independent subspaces that corresponds to the musical attribute.

19. The music search system of claim 18, wherein the music search application is implemented to compare the distances to a distance similarity threshold, and determine the similar audio file to the music file based on one or more of the distances that are less than the distance similarity threshold.

20. The music search system of claim 14, wherein the music search application is implemented to:
receive an additional music file including additional music content as part of the music search request;
combine the musical features of the music content with additional musical features of the additional music content into averaged musical features;
compare the averaged musical features corresponding to the musical attribute to the audio features of the audio files; and
determine the similar audio file to the music file based at least in part on the averaged musical features compared to the audio features.

* * * * *